US010289968B1

(12) United States Patent
Gersitz et al.

(10) Patent No.: US 10,289,968 B1
(45) Date of Patent: May 14, 2019

(54) VEHICLE REPOSSESSION UTILIZING TRACKING DEVICE INFORMATION

(71) Applicant: DriveTime Automotive Group, Inc., Phoenix, AZ (US)

(72) Inventors: John Patrick Gersitz, Queen Creek, AZ (US); Tamar Lynn Gade, Gilbert, AZ (US); Mark Graff Sauder, Scottsdale, AZ (US); Maureen Needham, Peoria, AZ (US); Jodi Cook, San Tan Valley, AZ (US)

(73) Assignee: DriveTime Automotive Group, Inc., Phoenix, AZ (US)

( * ) Notice: Subject to any disclaimer, the term of this patent is extended or adjusted under 35 U.S.C. 154(b) by 937 days.

(21) Appl. No.: 14/559,263

(22) Filed: Dec. 3, 2014

Related U.S. Application Data

(60) Provisional application No. 61/911,941, filed on Dec. 4, 2013.

(51) Int. Cl.
*H04W 64/00* (2009.01)
*G06Q 10/06* (2012.01)
*G06Q 30/08* (2012.01)

(52) U.S. Cl.
CPC ....... *G06Q 10/06311* (2013.01); *G06Q 30/08* (2013.01); *H04W 64/00* (2013.01)

(58) Field of Classification Search
None
See application file for complete search history.

(56) References Cited

U.S. PATENT DOCUMENTS 5,774,883 A    6/1998 Anderson et al.
6,025,774 A    2/2000 Forbes
(Continued)

FOREIGN PATENT DOCUMENTS

CA    2423974 A1 *    4/2002    ........... G06Q 20/102
WO    WO-2014031761 A2 *    2/2014    ............ G06Q 30/08

OTHER PUBLICATIONS

Shuchman, Philip. "Profit on Default: An Archival Study of Automobile Repossession and Resale," Nov. 1969, Stanford Law Review, vol. 22, pp. 20-66 (Year: 1969).*

(Continued)

*Primary Examiner* — Amanda Gurski
(74) *Attorney, Agent, or Firm* — The Marbury Law Group, PLLC

(57) ABSTRACT

Methods, devices, systems, and non-transitory process-readable storage media for utilizing information related to tracking devices to support repossession and improve financing account management. In some embodiments, a server processor is configured to obtain repossession agent information corresponding to a plurality of repossession agents (e.g., GPS coordinates of tracking devices in vehicles of repossession agents), obtain account information corresponding to a plurality of accounts in-default (e.g., GPS coordinates of tracking devices in vehicles of in-default accounts, etc.), identify a last known location for a borrower tracking device within the vehicle associated with each of the plurality of accounts in-default based on the obtained account information, and identify a nearby repossession agent for each of the plurality of accounts in-default by comparing the identified last known location for the borrower tracking device within the vehicle associated with each of the plurality of accounts in-default to the obtained repossession agent information.

22 Claims, 18 Drawing Sheets

(56) References Cited

U.S. PATENT DOCUMENTS

| | | | |
|---|---|---|---|
| 6,249,217 | B1 | 6/2001 | Forbes |
| 6,901,384 | B2 | 5/2005 | Lynch et al. |
| 6,950,807 | B2 | 9/2005 | Brock |
| 8,069,112 | B2 | 11/2011 | Hankey et al. |
| 2002/0082860 | A1 | 6/2002 | Johnson |
| 2007/0011083 | A1 | 1/2007 | Bird et al. |
| 2007/0143201 | A1* | 6/2007 | Swanson, Sr. ......... G06Q 30/08 705/37 |
| 2011/0195701 | A1 | 8/2011 | Cook et al. |
| 2012/0258731 | A1* | 10/2012 | Smith .................... H04W 4/025 455/456.1 |
| 2013/0132268 | A1* | 5/2013 | Cooper ................ G06Q 40/025 705/38 |
| 2013/0282515 | A1 | 10/2013 | Johnson et al. |
| 2014/0201266 | A1* | 7/2014 | Jackson ............... G08G 1/0175 709/203 |

OTHER PUBLICATIONS

Lombardi, Rosie. "Vehicle Database a Boon for Auto Industry," Sep. 2, 2005, Network World Canada; Downsview; vol. 15, Issue 13, p. 7 (Year: 2005).*

In Re Venner et al., No. 6391, LexisNexis; United States Court of Customs and Patent Appeals; Oral argument Nov. 7, 1958, Dec. 19, 1958.

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D.C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

Documents relating to the ex parte reexamination of U.S. Pat. No. 6,249,217 entitled , "Method for Retrieving Vehicular Collateral", ex-parte reexamination certificate issued Jun. 17, 2011.

Ex parte reexamination certificate of U.S. Pat. No. 6,249,217 entitled , "Method for Retrieving Vehicular Collateral", issued Jun. 17, 2011.

* cited by examiner

VEHICLE REPOSSESSION UTILIZING TRACKING DEVICE INFORMATION

RELATED APPLICATIONS

The present application claims the benefit of priority to U.S. Provisional Application No. 61/911,941, entitled "Vehicle Repossession Utilizing Tracking Device Information" filed Dec. 4, 2013, the entire contents of which are hereby incorporated by reference.

BACKGROUND

Property is often acquired by individuals using financing services. In particular, vehicles, such as cars and trucks, typically may be purchased from sellers using financing agreements (e.g., loans, lease, etc.) provided by financing entities (or lenders). Such financing agreements require borrowers to make scheduled payments and fulfill other obligations until the financing agreement is repaid. This system is beneficial to both borrowers and lenders alike, as property may be acquired by borrowers without having a full purchase amount and interest and/or fees may be received by lenders in exchange for providing financing.

Often borrowers fail to meet the obligations of their financing agreements (or "default"), such as by being late on payments, failing to acquire insurance, allowing property to become impounded, etc. When there are such failures, borrowers and/or their financing accounts may be considered to be in "default" status (or "in-default"), and lenders may act to repossess the property subject to the in-default financing agreements. In general, lenders may utilize external entities, such as repossession agents, to repossess property associated with in-default accounts. For example, a loan servicing company may provide a last and best known address of a borrower to a repossession agent who in turn may go to that address to repossess a car associated with the borrower's in-default account. However, such addresses may be out-of-date (e.g., the borrower has moved), or the property simply may not be located at these addresses (e.g., the borrower has driven his/her vehicle away from the house to work or on vacation, etc.), resulting in expensive additional efforts, such as skip tracing, by repossession agents to find and repossess the property.

SUMMARY

The various embodiments provide systems, methods, devices, and non-transitory media for utilizing information related to tracking devices to improve financing account management. In various embodiments, a server may be configured to utilize location information (e.g., GPS coordinates) related to a plurality of vehicles subject to financing agreements in-default and location information related to a plurality of repossession agents to efficiently identify appropriate, nearby repossession agents to perform repossessions of the properties. Various embodiments may enable data related to borrower tracking devices to be utilized to control communications with borrower devices. In some embodiments, a server may obtain account information corresponding to a borrower account including location information of a borrower tracking device within a vehicle associated with the borrower account, generate a message based at least in part on the obtained account information, and transmit the generated message to a borrower device associated with the borrower account. For example, the message may cause a borrower tracking device to emit a buzz via an internal speaker (or a "buzzer" unit within the borrower tracking device).

An embodiment method for a server to utilize information related to tracking devices to support repossession may include operations for obtaining repossession agent information corresponding to a plurality of repossession agents, wherein the repossession agent information may include location information of repossession agent tracking devices associated with each of the plurality of repossession agents, obtaining account information corresponding to a plurality of accounts in-default, wherein the account information may include location information of borrower tracking devices within a vehicle associated with each of the plurality of accounts in-default, identifying a last known location for a borrower tracking device within the vehicle associated with each of the plurality of accounts in-default based on the obtained account information, and identifying a nearby repossession agent for each of the plurality of accounts in-default by comparing the identified last known location for the borrower tracking device within the vehicle associated with each of the plurality of accounts in-default to the obtained repossession agent information. In some embodiments, the location information of repossession agent tracking devices associated with each of the plurality of repossession agents and the location information of borrower tracking devices within the vehicle associated with each of the plurality of accounts in-default may include GPS coordinates. In some embodiments, the vehicle associated with each of the plurality of accounts in-default may be any of a car, a truck, a motorcycle, a boat, a recreational vehicle (RV), an all-terrain vehicle (ATV), a jet ski, and a plane.

In some embodiments, obtaining repossession agent information corresponding to the plurality of repossession agents may include obtaining repossession agent information corresponding to the plurality of repossession agents having a preferred status. In some embodiments, the method may further include transmitting to the repossession agent tracking devices associated with the identified nearby repossession agent for each of the plurality of accounts in-default a message that indicates the last known location for the borrower tracking device within the vehicle associated with that respective account in-default. In some embodiments, the method may further include calculating a route and a cost for repossessing vehicles for each of the plurality of accounts in-default.

In some embodiments, the method may further include identifying a plurality of nearby repossession agents for the account in-default by comparing the identified last known location for the borrower tracking device within the vehicle associated with the account in-default to the obtained repossession agent information.

In some embodiments, the method may further include transmitting to the repossession agent tracking devices associated with the identified plurality of nearby repossession agents an offer message that indicates the last known location for the borrower tracking device within the vehicle associated with the account in-default, receiving an acceptance response from one of the identified plurality of nearby repossession agents, and associating the one of the identified plurality of nearby repossession agents with the account in-default. In some embodiments, the method may further include calculating an offer amount for each of the identified plurality of nearby repossession agents based on the obtained repossession agent information, and wherein transmitting to the repossession agent tracking devices associated with the identified plurality of nearby repossession agents the offer message that indicates the last known location for the borrower tracking device within the vehicle associated with the account in-default may include transmitting, to the repossession agent tracking devices associated with the identified plurality of nearby repossession agents, the offer message that indicates the last known location for the borrower tracking device within the vehicle associated with the account in-default and the offer amount calculated for the respective identified plurality of nearby repossession agents. In some embodiments, the method may further include calculating a starting bid for the account in-default, transmitting, to the repossession agent tracking devices associated with the identified plurality of nearby repossession agents, an offer message that indicates the last known location for the borrower tracking device within the vehicle associated with the account in-default and the starting bid for the account in-default, receiving a bid message from each one of the identified plurality of nearby repossession agents in response to transmitting the offer message, selecting the one of the identified plurality of nearby repossession agents submitting a highest of the received bid messages, and associating the selected one of the identified plurality of nearby repossession agents with the account in-default. In some embodiments, the method may further include generating a notice for the account in-default, and transmitting to the repossession agent tracking devices associated with the identified plurality of nearby repossession agents the notice.

Further embodiments include a computing device configured with processor-executable instructions for performing operations of the methods described above. Further embodiments include a non-transitory processor-readable medium on which is stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
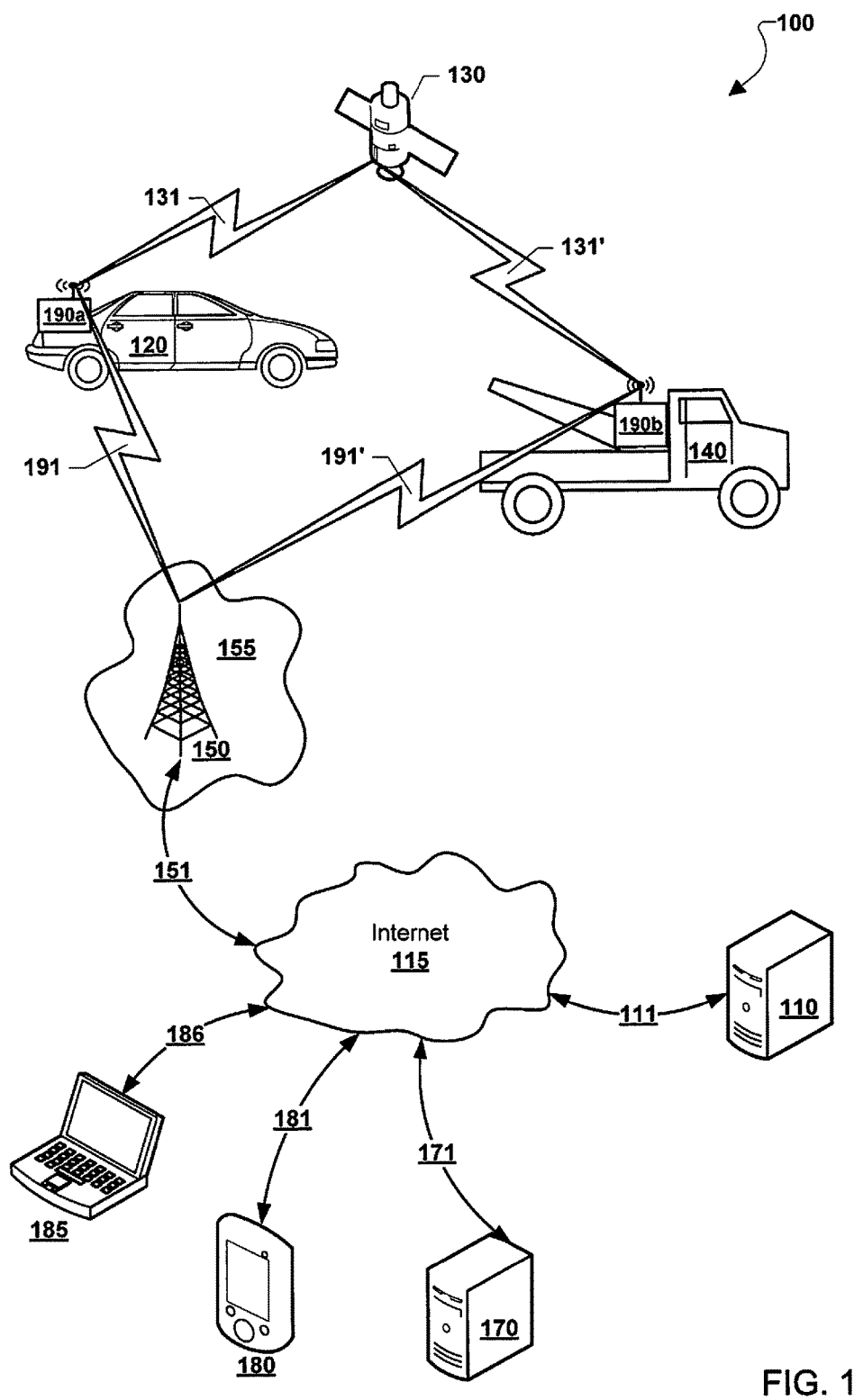
FIG. 1 is a component block diagram of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "mobile device" or "computing device" are used interchangeably herein to refer to any one or all of desktop computers, cellular telephones, smart phones, personal or mobile multi-media players, personal data assistants (PDA's), laptop computers, tablet computers, smart books, retail terminals, palm-top computers, wireless electronic mail receivers, multimedia Internet enabled cellular telephones, wireless gaming controllers, and similar electronic devices which include a programmable processor and memory and circuitry for performing operations discussed herein, such as establishing network connections, receiving user input, and rendering data.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "financing agreement" is used herein to refer to a loan, a lease, a bond, a note, or other contract related to the purchase of a property. For example, a financing agreement may be a car loan or auto financing that extends credit for the purpose of purchasing a new or used automobile. Financing agreements may be a contractual relationship between a "borrower" (i.e., a party or entity obtaining property via credit, such as an individual obtaining a new car via a car loan) and a "lender" (i.e., a party or entity extending credit in exchange for subsequent payments and/or a property interest or collateral from the borrower). Lenders may include banking institutions, loan servicing entities, car lots capable of extending credit, or other lending institutions.

The term "in-default" is used herein to describe a condition or status of a financing agreement or related account in which the borrower has failed to meet obligations under the financing agreement (i.e., the borrower has "defaulted"), and thus the property associated with the financing agreement may be legally repossessed. For example, a car loan (or car loan account) may be in-default when the borrower fails to make payments to the lender as indicated by a repayment schedule defined in the terms of the car loan.

The terms "repossession agent", "repo agent", and "repo man" are used interchangeably herein to refer to any person, company, or entity that performs repossession services related to property subject to a financing agreement (or an account) in default. For example, a repossession agent may be an individual or a company including a plurality of individuals. Repossession agents may typically receive contracts to repossess property (also referred to as "repossession assignments") from lenders that indicate property that may be repossessed due to corresponding financing agreements being in-default. For example, a repossession agent may be awarded a repossession assignment by a bank to repossess a car when the loan for the car is in-default.

In some cases, property subject to financing agreements may be equipped with devices that report global positioning system (GPS) data of the property. For example, when a car is obtained via a car loan, the lender for the car loan may require that a GPS receiver be placed on the car for tracking purposes. Systems may store the GPS data of property and those systems may be queried by various parties, such as car lots, lenders, and repossession agents. For example, a lender or repossession service may look up via an online portal a property (e.g., a car) on demand, determine last reported GPS coordinates of the property, and attempt to repossess the property at those GPS coordinates.

The various embodiments provide systems, methods, and devices for utilizing information related to tracking devices to improve financing account management. In particular, a server may be configured to utilize location information (e.g., GPS coordinates) related to a plurality of vehicles subject to financing agreements in-default and location information related to a plurality of repossession agents to efficiently identify appropriate, nearby repossession agents to perform repossessions of the properties. Such location information may be generated by tracking devices placed within the vehicles subject to financing agreements (or "borrower tracking devices") and tracking devices placed within vehicles used by repossession agents (or "repossession agent tracking devices), respectively. For example, the server may receive and process GPS coordinates from borrower tracking devices within cars associated with car loans in-default and from a multitude of repossession agent tracking devices in individual tow trucks. The server may process information of in-default accounts in bulk (or in batches), comparing the last known location of a plurality of borrower tracking devices to the locations of a plurality of repossession agent tracking devices to identify the most appropriate repossession agent to repossess each vehicle associated with the borrower tracking devices. In some embodiments, the server may associate (or assign) repossession assignments to repossession agents that are the closest to a vehicle associated with an in-default account. In other embodiments, the server may also utilize other information related to in-default accounts and/or repossession agents, such as success rates, preferred status, and size of businesses, to identify appropriate repossession agents to associate with various repossession assignments.

Using the techniques described herein, the server may improve the efficiency and success of a large number of repossessions by basing assignments to repossession agents on up-to-date tracking device location information, as opposed to home addresses, addresses of record, or other less-reliable information related to the whereabouts of borrowers and/or vehicles subject to financing agreements.

In various embodiments, the server may assign or otherwise offer repossession assignments to repossession agents that may or may not have a preferred status, such as a priority status with a particular lender based on a pre-existing business relationship. Repossession agents having preferred status may be prioritized by the server as these agents may be obligated to execute repossession assignments at a cheaper rate than repossession agents without a preferred status. For example, the server may be configured to transmit an offer to engage in a repossession assignment to a first repossession agent that is pre-approved by a lender before transmitting the offer to a second repossession agent that is not pre-approved. The server may determine preferred status based on evaluating stored information regarding repossession agents, such as data within registration profiles and/or data received from an external data source (e.g., a lender computing device, a repossession agent tracking device, etc.).

In some embodiments, a server may utilize obtained information to auction repossession assignments to a plurality of repossession agents. In particular, the server may identify a group of repossession agent tracking devices within a certain distance to a borrower tracking device associated with an in-default vehicle account, and may transmit messages to each repossession agent in the group indicating the repossession agent may transmit bid messages to win a repossession assignment for the in-default account. For example, the server may transmit messages to the repossession agent tracking devices near a car's GPS coordinates and may associate the corresponding assignment to repossess the car with the repossession agent tracking device that transmits a bid message with the lowest bid value (i.e., the lowest dollar amount needed to repossess the car). The server may also evaluate stored information about bidding repossession agents, such as reliability factors and/or success rates, when determining a winning bid. In this way, the server may enable lenders to open repossession assignments to any available repossession agent within vicinity of vehicles to be repossessed.

In some embodiments, the server may be configured to generate routes and potential costs for particular repossession agents to repossess a vehicle associated with an in-default account. For example, the server may identify a path between a predefined location of a repossession yard or current location of a repossession agent vehicle and a vehicle to be repossessed, and based on that identified path, calculate a travel cost (e.g., fuel, mileage, etc.) that may be incurred by the repossession agent when utilizing that path. Such routes may be one-way (i.e., from a predefined repossession yard to the in-default vehicle) or round-trip (i.e., from the repossession yard to the vehicle to be repossessed back to the repossession yard or another final destination). Further, such routes and costs may be transmitted to repossession agents during the auction or bidding process described herein to provide repossession agents with additional information for determining whether to bid on or otherwise accept a particular, repossession assignment.

In some embodiments, the server may be configured to generate custom offers to repossession agent tracking devices near a borrower tracking device associated with an in-default account. For example, the server may calculate a first offer amount for a first repossession agent tracking device and a second offer amount for a second repossession agent tracking device based on current GPS coordinates of the agents compare to a car to be repossessed. The server may associate repossession agents with repossession assignments in response to receiving acceptance messages.

In some embodiments, a server may be configured to generate and transmit notices based on obtained location information related to tracking devices. In particular, when a repossession agent tracking device is determined to be nearby to a borrower tracking device associated with an in-default account, the server may generate a notice for the nearby repossession agent to receive and deliver to the borrower. For example, when a repossession agent tracking device is within a few blocks of a car associated with a car loan in default, the server may transmit a message to the repossession agent tracking device that includes a warning for delivery to a borrower, indicating the car may be repossessed and that the borrower should contact the appropriate lender immediately.

In some embodiments, in addition to performing operations corresponding to repossession agents, in some embodiments, a server may be configured to generate and transmit messages to a borrower device based on location information from an associated borrower tracking device. Such communications may be transmitted by the server to the borrower tracking device and/or another borrower device (e.g., a mobile device) when borrowers are or are not in-default conditions with regard to a loan, lease, or other financing agreement. In this way, data from such a borrower tracking device may be beneficially used to not only assist repossession agents to retrieve property when accounts are in-default, but also to help improve customer relations with borrowers by providing helpful information about vehicles and/or accounts, encouraging maintenance of (or reducing damage to) vehicles subject to a financing agreement, and/or incentivizing borrower compliance in repossession efforts. Embodiment techniques may improve the probability and cost of recovery, as well as potentially reducing the damage to vehicles associated with borrowers.

In various embodiments, such messages to borrower devices from the server may be short-message service messages (SMS), emails, proprietary messages to a mobile device application (e.g., push notifications through an "app", etc.), phone calls (e.g., automated messages sent via a cellular network, telephonic calls to a borrower's land-line telephone, phone calls using non-automated systems, etc.), messages to the borrower tracking device that may cause the device to emit a sound or other indicator (e.g., buzzing, play a sound file via an internal speaker, play a sound via a speaker system of the vehicle, etc.), and/or other type communications to the borrower devices as appropriate based on various factors including legal and administrative requirements, borrower relationship considerations, etc. For example, the server may send messages via SMS text messaging that indicate to a borrower that their insurance has lapsed, the vehicle is due for maintenance (e.g., oil change, etc.), payments on the account are past due, etc. In some embodiments, the server may transmit different types of messages based on current conditions or states of a borrower account. For example, when the borrower account is not in-default, the server may utilize messages to the borrower tracking device that cause sounds (e.g., buzzes, etc.) to be emitted, but when in-default, the server may utilize the buzz messages and/or auto-dialed calls and/or emails, SMS text messages, and app push notifications.

In particular, in some embodiments, the server may be configured to present personalized messages to devices in response to determining a tracking device has entered a certain area. For example, based on comparing up-to-date location information received from a borrower tracking device to stored information of affiliated businesses, the server may determine the borrower's car has pulled into a certain garage bay of an affiliated garage. In response, the server may transmit a message via Internet protocols to a computing device connected to displays within the garage bay, causing the displays to render a message to the borrower (e.g., "Mr. X, you're 14 days overdue on your car payment."). As another example, the server may transmit another message to the garage computing device that indicates a service history (e.g., dates of oil changes, details of previous maintenance work, VIN, make, model, year, etc.) of the borrower's car and/or an identifier of the borrower that may be used by the computing device to perform a look-up on a local database to obtain the service history.

In some embodiments, the server may be configured to compare obtained location information from a borrower tracking device to locations of predefined buildings or areas in order to make determinations related to actions the borrower and/or a repossession agent should next take. The server may compare current location information (e.g., current GPS coordinates) of a borrower's vehicle to known impoundment or repossession lot locations, such as geofence areas representing geographical areas around or encircling impoundment lots. For example, the server may use the vehicle's GPS coordinates to identify that the vehicle is within an area that is not typically associated with a contracted or otherwise approved repossession agent, such as a police impound or a lot that is controlled by a non-participating entity (e.g., a competing repossession agent, etc.). When the vehicle is within such a known impoundment lot (or geofence associated with such an impoundment lot), the server may further determine how long the vehicle has been located there. When the vehicle has been within the impoundment lot for a period of time that exceeds a predefined threshold time (e.g., a number of hours, days, etc.), the server may determine that the vehicle has been impounded (or repossessed via a non-standard or expected manner), and thus may transmit a message to the borrower and/or a repossession agent indicating this condition. Such messages may include special instructions for retrieving the vehicle, such as an address, contact information, and/or protocols (e.g., fees to pay to impoundment lot, etc.) to follow in order to best retrieve the vehicle.

In some embodiments, the server may be configured to compare current location information received from a borrower tracking device in a borrower's vehicle to known payment centers at which the borrower may make a payment or otherwise satisfy agreement obligations (e.g., surrender a vehicle related to an in-default account, etc.). The server may determine whether a current location (e.g., GPS coordinates) of the vehicle are within a predefined area or geofence around one of a set of predefined payment centers. For example, the server may determine whether a vehicle's reported GPS coordinates are within a distance threshold (e.g., within a few hundred feet, miles, etc.) of a building capable of receiving payments on delinquent accounts. When the tracking device within the vehicle is determined to be near such a payment center, the server may transmit messages to the tracking device and/or other devices of the borrower's (e.g., smartphone) indicating the payment center is near, its address, and reminders about the account (e.g., "you're in-default, so please make a payment nearby."). In some embodiments, the server may identify an offer or incentive to the borrower that is more cost effective than the costs that would be required to utilize a repossession agent to recover the borrower's vehicle.

In some embodiments, messages from the server may cause a borrower tracking device to buzz or otherwise emit sounds or indicators for a predefined period (e.g., 60 seconds, etc.), thus indicating an account state, such as in-default, past due, etc. The server may keep track of messages transmitted to the borrower tracking device (or other borrower devices), and may generate subsequent messages based on whether any responses were received from the borrower. For example, if a borrower is past due and the buzzer functionally has been initiated in the borrower tracking device based on a first message from the server and no response is given by the borrower (e.g., no phone call, no return text, etc.), the server may transmit a second message that causes the borrower tracking device to vary buzzer lengths, frequencies, and/or cadences. In some embodiments, messages from the server to the borrower tracking device may define different buzzes or sounds to be emitted by the borrower tracking device based on the borrower's state of default or delinquency regarding his borrower account. For example, when the borrower has not responded to a previous message that caused the borrower tracking device to buzz within a certain number of days, subsequent messages from the server may cause the borrower tracking device to buzz for longer periods of time or in different ways. As another example, the past due length or past due amount of a borrower account may cause the server to send messages that cause the borrower tracking device to buzz in different ways, such as varying durations, frequencies, cadences, etc. As an illustration, when a borrower account is 1 day past due, the server may transmit a first message that may cause the borrower tracking device to buzz for 60 seconds, but when the account is 5 days past due, the server may transmit a second message that causes the borrower tracking device to buzz for 60 seconds and then 10 additional seconds.

In some embodiments, location information from the borrower tracking device may be used by the server to verify account information related to a borrower. In particular, information related to a financing agreement (e.g., loan), such as borrower addresses (e.g., home street address, work address, etc.) may be verified based on GPS data indicating locations the borrower's vehicle has traveled to over a period of time. For example, the server may evaluate GPS coordinates received from the borrower tracking device in the vehicle over time to determine whether the vehicle traveled to the home address. If not, an updated home address may be requested by the server, as the borrower may no longer live at the originally supplied address. As another example, based on locations traveled over a period of time (e.g., a month, etc.), the server may determine that the borrower has not traveled to a geofence associated with the borrower's work address, and may thus conclude that the borrower is out-of-work or has changed jobs, which may request a follow-up communication to confirm the borrower's work status. Such conclusions of the borrower's account information may be transmitted to skip trace organizations, repossession agents, and other parties in the event that the borrower's account falls into default. In some embodiments, the server may transmit messages to the borrower tracking device that indicate the borrower should contact an appropriate party or the server to confirm account information that may no longer be accurate. For example, the server may transmit a message causing the borrower tracking device to buzz or play an audio file indicating that the borrower should call to confirm his home address. Such identifications may not indicate that a default has necessarily occurred, but may be used to indicate a potential default scenario related to not providing accurate information at a point of sale of the vehicle or otherwise during the financing agreement process. In other words, using location information from the borrower tracking device may validate early underwriting. Such actions may work to mitigate risk to lenders as well as borrowers, as communications to verify account information may enable more effective or properly avoided repossession efforts based on provided or omitted information from borrowers that clarifies potential inconsistencies or problems with their account information (e.g., verifies home or work address, work status changes, etc.).

In some embodiments, the server may identify or calculate mileage on a borrower's vehicle based on location information from the borrower tracking device. Based on the mileage, the server may determine whether the vehicle has or is about to exceed a maximum mileage as defined within a financing agreement (e.g., lease or loan agreement). If so, the server may transmit messages to warn the borrower of potential or actual breaches of the financing agreement, as well as indicating any fees that may be incurred for such breaches. For example, based on GPS data received from the borrower tracking device over a period, the server may calculate the distance traveled and thus determine that the vehicle may likely exceed their contract maximum mileage prior to the end of the lease term. In such a scenario, the server may use various communications to warn the borrower, such as by using a dialer mechanism to call the borrower's phone, a buzz message to the borrower tracking device, or an SMS text message to the borrower's smartphone. Calculating mileage may be useful, as a lender may recalculate expected mileage at time of termination of a lease or agreement and may try to collect on that throughout the lease term or in a lump sum at the end of the lease. Further, a lender may use the calculated mileage to determine a more accurate vehicle depreciation value and risk of re-leasing a vehicle.

In some embodiments, the server may send messages to indicate that maintenance is required based on calculated mileage. For example, messages may be sent to the borrower and/or a warranty provider instructing the provider to call the borrower to schedule a maintenance appointment.

In some embodiments, the server may receive location information (e.g., GPS coordinates) from other devices associated with the borrower in addition to from the borrower tracking device. In particular, the server may receive GPS coordinates from a mobile device of the borrower's that is configured to execute an application (or app) associated with the server. For example, the borrower's smartphone may periodically transmit GPS coordinates indicating the likely location of the borrower. The server may use information from both types of devices to make further conclusions relevant to the borrower and/or their account. For example, the server may compare GPS coordinates received from the borrower's smartphone and GPS coordinates received from the borrower tracking device to determine whether the borrower is currently within the vehicle associated with the borrower tracking device. Based on such conclusions, the server may transmit different messages (e.g., "Since you are in your car, please check your mileage," "Please continue on to a nearby payment center to pay your bill," etc.). While messages may be sent to the borrower's devices, such as a smart phone, it should be appreciated that various communications may or may not always be available for use based on multiple factors, one of which may be applicable regulations or laws in a given place or time. In the various embodiments, applicable regulations or laws governing communications in the borrower's (and/or the server's) location may be checked prior to sending communications (e.g., messages) to the borrower's devices, and those communications that would violate applicable regulations or laws governing communications may be held, modified, etc., to comply with the applicable regulations or laws governing communications. For example, the transmission of text messages to devices in a moving vehicle may not be allowed by regulations in some jurisdictions, and in various embodiments when the server determines that the borrower may be in a moving vehicle in a jurisdiction where regulations do not allow text messages to devices in a moving vehicle, the server may hold a message that would otherwise be sent to the borrower.

When a vehicle with a tracking device is repossessed and then sold (e.g., at auction), it may be beneficial for parties acquiring the sold vehicle to continue utilizing the tracking device for various purposes, such as location tracking and general communications. Accordingly, in some embodiments, the server may be configured to perform operations that transfer, adjust, and/or otherwise re-use data associated with the tracking device of a repossessed, sold vehicle. For example, in response to receiving data indicating that a particular vehicle having a tracking device has been sold to a new party at auction, the server may be configured to update stored data (e.g., accounts or profiles associated with the tracking device) to include new borrower data (e.g., personal information, contact information (e.g., email address, cell phone address, etc.), current mileage information, new location information (e.g., home address, work address, etc.), etc.), new lease or loan agreement data (e.g., maximum mileage allowed, etc.), and/or new relevant locations for the tracking device (e.g., a new set of GPS coordinates for local payment centers, repossession yards, etc.). Such operations by the server may not only provide functionality that may be useful to new owners and/or borrowers, but also that may preclude access to sensitive information to old, irrelevant borrowers and/or owners. For example, when a vehicle with a tracking device is transferred to a new owner, all data (e.g., location information, etc. stored within profiles or accounts associated with the tracking device may be cleared of permissions and/or data related to the old owners and/or borrowers such that subsequent messages from the server may only be sent to the new, relevant parties. In some embodiments, in response to receiving data indicating a vehicle with a tracking device has been sold at auction, the server may perform operations to package and transmit relevant tracking device accounts/profiles/functionalities to a new party's computing device (e.g., a new tracking server, etc.). In this way, tracking devices may not need to be removed after repossession and/or subsequent sale. In some embodiments, the server may perform operations to suspend the tracking device or place it in a "sleep" mode, for example in response to receiving data indicating a vehicle with a tracking device has been sold. The tracking device may be assigned a telephone number and static Internet Protocol ("IP") address when initially installed in the vehicle. On demand or after a certain period of time (e.g., expiration of a loan period), the SIM of the tracking device may be suspended (i.e., sleep mode may be initiated). The assigned telephone number may not be recycled even though the SIM may be suspended, for example in response to a message from the server to the wireless carrier to not recycle the telephone number, default rules associated with the telephone number, etc. In this manner, the assigned telephone number may not be recycled and the telephone number and static IP address may live with the tracking device. When reactivation or "wake up" of the device is desired, the server may connect to the tracking device using the static IP address and may assign a new telephone number to the tracking device. The new telephone number may then be used for communication with the tracking device, for example to help in recovery of the vehicle.

In some embodiments, a server may configure auto-dialer operations based on obtained location information. For example, the server may configure an auto-dialing module to call a borrower on his home phone when it is determined the current GPS coordinates of the borrower's car coincide with the borrower's home address. It should be appreciated that such auto-dialing operations may merely be one optional form of communication that may be utilized to communicate with borrowers.

In some embodiments, the server may be configured to process and store information received from tracking devices within vehicles associated with a retail vehicle lot or warehouse. Such data may be useful for inventory and dealership lot management. For example, the server may receive periodic messages from tracking devices within rental cars (or test drive cars) that indicate current mileage from odometers, average speed, how often the cars are driven, the duration of average test drives, battery issues, locations, etc. Such stored information in the server may be archived, processed, and transmitted to partner computing devices (e.g., dealership computing devices, etc.) in order to provide data for designing floor plans and otherwise organizing inventories of vehicles on lots. Further, such stored information may be transmitted to borrowers to promote improved relationships between financing services and borrowers. For example, the server may be configured to transmit messages, such as via auto-dialing routines using voice over Internet protocols, to inform borrowers of important account conditions, such as when car loan payments are overdue, when the current mileage on leased cars is approaching (or has exceeded) a predefined limit, etc.

The various embodiments may improve the functioning of a server and/or a tracking device by enabling servers and/or tracking devices to support repossession in manners previously unsupported by conventional systems. The various embodiments may improve the functioning of a server and/or a tracking device by enabling servers and/or tracking devices to control communications in manners previously unsupported by conventional systems. The various embodiments may improve the functioning of a server and/or a tracking device by enabling tracking devices to be suspended or put to "sleep" and to be reactivated or "woken up" by maintaining the same static IP address for the tracking device and preventing recycling of the tracking device's telephone number during suspension or "sleep" periods.

The various embodiments may be describe herein in terms of functionalities of a server (or tracking server) for processing information related to tracking devices, such as evaluating GPS coordinates of borrower and repossession agent tracking devices. However, those skilled in the art should appreciate that any number of computing devices or servers may be configured to perform the disclosed functionalities. For example, a first server may be configured to periodically receive GPS coordinates from various tracking devices via Internet protocols and a second server may be configured to obtain the coordinates from the first server for evaluation. Further, the server (or tracking server) may be integrated into or distinct from computing systems of financing services. For example, the server may periodically receive from a banking computing device information indicating account information including GPS coordinates related to loans in-default. As another example, the server may evaluate stored account information to identify loans in-default and related GPS coordinates.

Further, it should be appreciated to those of skill in the art that not only may various forms of communications be used with the embodiments described herein, but also that the use of particular communication formats, mediums, and/or techniques at a given time and/or place may be determined based on applicable administrative and/or legal considerations, such as local, state, and/or federal laws, policies, guidelines, and/or other regulations for safety, fair business practices, privacy, and other similar concerns. For example, autodialing communications may or may not be utilized based on privacy regulations (e.g., do not call (DNC) prohibitions, etc.) effective in jurisdictions for particular borrowers. As another example, SMS text messages may or may not be utilized to convey information to borrowers and/or repossession agents based on state or local laws prohibiting texting while driving and/or the use of hands free devices. Additional examples of other legal or administrative limitations placed on communications will be apparent to one of ordinary skill in the art. References herein to particular communication formats may be exemplary as well as dependent upon such considerations on a case-by-case basis (e.g., state-by-state basis, locality-by-locality basis, borrower-by-borrower basis, etc.). Accordingly, the various communications, especially communications with borrowers, described herein are provided merely as examples, and one of ordinary skill in the art will understand that the specific communication sent by systems and devices of the various embodiments may be controlled/limited to comply with the appropriate administrative, legal, or other requirements such that the communications sent in the various embodiments comply with the appropriate administrative, legal, or other requirements.

FIG. 1 illustrates an embodiment communication system 100 that includes a first vehicle 120 associated with a borrower and a second vehicle 140 associated with a repossession agent. As described above, the first vehicle 120 may be a vehicle acquired by the borrower using financing provided by a lender, such as a bank, car lot, or other third-party financing institution. The first vehicle 120 may be any type of automobile or conveyance, such as a car, a truck, a motorcycle, a boat, a recreational vehicle (RV), an all-terrain vehicle (ATV), a jet ski, a plane, etc. For example, the first vehicle 120 may be a "used" or "pre-owned" sedan purchased by the borrower at a car lot. The second vehicle 140 may be any automobile used by repossession agents, such as a car or a tow truck. For example, the second vehicle 140 may be a truck that is used to tow vehicles being repossessed due to a bank loan default or a car driven by repossession agents as they drive to a known address to place a notice on the first vehicle 120.

Both the vehicles 120, 140 may be equipped with tracking devices 190a, 190b, as described below with reference to FIGS. 2A-2B. For example, a first tracking device 190a (or "borrower tracking device") may be affixed to the chassis, installed within the trunk, positioned under the hood, or attached to another portion of the structure of the first vehicle 120. As another example, a second tracking device 190b (or "repossession agent tracking device") may be installed on the dash of the second vehicle 140 to enable repossession agents within the second vehicle 140 to view related information (e.g., nearby cars to be repossessed, current GPS coordinates, active repossession assignments, etc.) displayed on an attached screen.

In various embodiments, the tracking devices 190a, 190b may or may not be configured to emit, render, or otherwise display information and/or receive input from users. For example, the first tracking device 190a may be hidden within the first vehicle 120 so that the borrower may not tamper with the tracking device 190a but still may be able to hear buzzes or other sounds emitted from the tracking device 190a. As another example, the second tracking device 190b may include a keyboard and display so that repossession agents within the second vehicle 140 may interface with the second tracking device 190b (e.g., view/respond to received messages from a dispatch/server, input bid amounts for repossession assignments, etc.).

The tracking devices 190a, 190b may be configured to receive signals 131, 131' from a positioning system, such as the constellation of Global Positioning System (GPS) satellites 130 in orbit above the Earth and the vehicles 120, 140. The signals 131, 131' from the positioning system may be used by the tracking devices 190a, 190b to determine the current location of the vehicles 120, 140, for example the current GPS coordinates (e.g., latitude, longitude, elevation, etc.) of the vehicles 120, 140. In various embodiments, the data from the signals 131, 131' may be processed by a processor within the tracking devices 190a, 190b and/or another computing device (e.g., a remote server). For example, in response to receiving messages including GPS coordinates from the first tracking device 190a within the first vehicle 120 over the Internet 115, a tracking server 110 may compare the received GPS coordinates to stored location information (e.g., perimeter GPS coordinates of a known building, street, zip code, etc.) to determine whether the second vehicle 140 is within a predefined location (e.g., within a geofence of a garage, at a residence associated with an account, etc.).

The tracking devices 190a, 190b of the vehicles 120, 140 may be configured to exchange signals over long-range wireless links 191,191' with a base station 150 (or cellular tower) that is associated with a cellular or mobile network 155. Such a mobile network 125 may provide access to the Internet 115 via a connection 151. For example, using a cellular network transceiver to transmit the signals over the long-range wireless link 191, the tracking device 190a within the first vehicle 120 may exchange data (e.g., GPS coordinates, mileage information, operating conditions data, etc.) with the tracking server 110 via the mobile network 155. As another example, the tracking device 190b within the second vehicle 140 may receive repossession assignment information (e.g., specific information about a car to repossession, legal documentation for the repossession assignment, billing information, etc.) in response to transmitting current GPS coordinates of the second vehicle 140 to the tracking server 110 via the mobile network 155. In various embodiments, the tracking devices 190a, 190b and the tracking server 110 may be configured to exchange encoded, encrypted, or otherwise obscured information via the links 191, 191'.

The tracking devices 190a, 190b may be related to, known by, or otherwise registered with a tracking service (or tracking entity) associated with the tracking server 110 connected to the Internet 115 via a connection 111. In particular, the tracking server 110 may be configured to store and process information associated with the tracking devices 190a, 190b, the vehicles 120, 140, and other information related to both the borrower and the repossession agents. For example, the tracking server 110 may be configured to store (or alternatively receive from an external data source and then store) account information describing the default status of a loan (e.g., a car loan) related to the borrower. As another example, the tracking server 110 may be configured to store information describing the personnel, capabilities, availabilities, contracts, and status of repossession services within a certain geographical area (e.g., a city, town, etc.).

The tracking server 110 may be configured to exchange data and/or various communications with various devices via the Internet 115. In particular, the tracking server 110 may exchange account information, billing information, and other data related to the borrower with a third-party server 170. The third-party server 170 may exchange communications over the Internet 115 via a wired or wireless connection 171. In some embodiments, the third-party server 170 may be associated with a lending service (e.g., a bank), a skip tracking service, a billing service, and/or any other entity, service, and/or data source that may include information about the borrower. For example, the third-party server 170 may periodically transmit data to the tracking server 110 indicating batches of accounts in-default or otherwise, such as when the borrower has defaulted on a loan corresponding to the first vehicle 120. In some embodiments, the third-party server 170 may maintain and transmit information related to repossession services. For example, the third-party server 170 may store data indicating the names, identifiers, availabilities, and other characteristics of repossession agents within a particular region (e.g., city, state, county, country, etc.). As another example, the third-party server 170 may store data indicating whether particular repossession agents have a preferred status with particular lending agencies, car lots, or other institutions related to financing.

In some embodiments, the tracking server 110 may also be configured to exchange communications with a smartphone mobile device 180 connected to the Internet 115 via a wireless connection 181 and/or a laptop computing device 185 connected to the Internet 115 via a wired or wireless connection 186. For example, the tracking server 110 may transmit an SMS text message to the smartphone mobile device 180 indicating that the borrower is within a certain predefined location. As another example, the tracking server 110 may transmit an email that may be received and accessed at the laptop computing device 185. In various embodiments, the smartphone mobile device 180 and/or the laptop computing device 185 may be associated with the borrower and/or another party, such as a repossession agent. For example, the laptop computing device 185 may be within a garage affiliated with the tracking server 110 and/or a repossession agent. As another example, the smartphone mobile device 180 may be carried by a repo man in the field. In various embodiments, the laptop computing device 185 and/or the smartphone mobile device 180 may be configured to connect to a wireless network access point. For example, the devices 185, 180 may exchange signals with a Wi-Fi® router included within a local area network. In some embodiments, the tracking server 110 may be configured to transmit data via voice over Internet protocols (VOIP) communications. For example, the tracking server 110 may be configured to transmit automated voice calls, such as via an auto-dialer routine, software, or module, for receipt by the smartphone mobile device 180 and/or the laptop computing device 185 or any other device configured to participate in call functions.

Figure 2A:
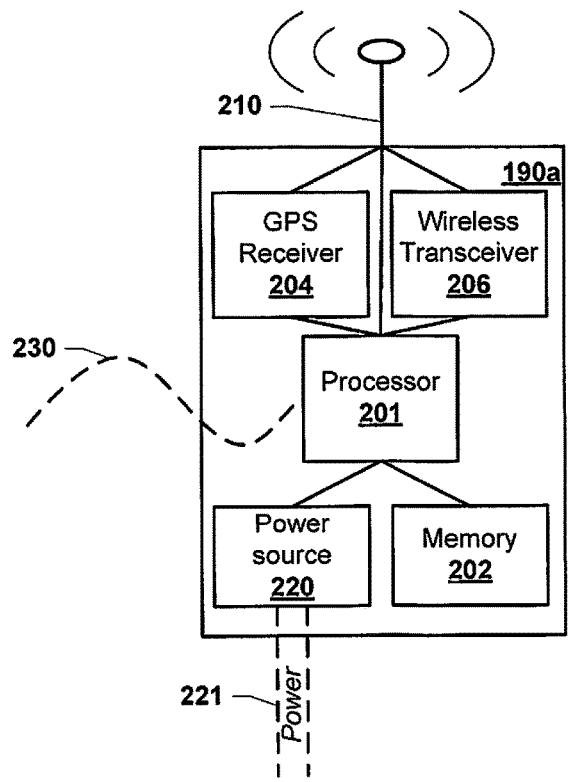
FIGS. 2A-2B are component block diagrams illustrating embodiment tracking devices that may be used in various embodiments.

FIG. 2A illustrates an embodiment tracking device 190a that may be installed within a vehicle as described above. For example, the tracking device 190a may be installed within the trunk of a car subject to a financing agreement. Coupled to a processor 201, the tracking device 190a may include a GPS receiver 204, a wireless transceiver 206 (e.g., cellular network transceiver, Wi-Fi radio, etc.), and antennae 210 for sending and receiving electromagnetic signals. The processor 201 may be one or more multicore integrated circuits (ICs) designated for general or specific processing tasks. The transceiver 206 and antennae 210 may be used with the above-mentioned circuitry to implement the various wireless transmission protocol stacks and interfaces. The tracking device 190a may further include a power source 220 (e.g., a battery, a plug or interface for receiving power from an external power outlet, etc.) and a memory 202 coupled to the processor 201. For example, the tracking device 190a may include a lithium battery or alternatively may be plugged into an automobile battery via a permanent connection 221. The memory 202 may be volatile or non-volatile memory, and may also be secure and/or encrypted memory, or unsecure and/or unencrypted memory, or any combination thereof. As an example, the memory 202 may be a subscriber identification module ("SIM") that may be integrated into the tracking device 190a or may be a removable card that stores information used to identify and/or authenticate the tracking device 190a to a network and enable communication with the network. In other embodiments, a separate SIM in addition to the memory 202 may be included in the tracking device 190a. In an optional embodiment, the tracking device 190a may also include a connection 230 to a computing within a vehicle, such as a navigation system and/or a primary computer system configured to monitor and control the operations of an automobile (e.g., speed regulator, fuel injection, sensors, etc.). For example, via the connection 230, the tracking device 190a may communicate with a car computing system to determine the current speed, the current mileage, tire pressure values, open doors, condition of brakes, and other operating conditions of a vehicle. The tracking device 190a may be configured to transmit messages, such as messages to a tracking server, that include such information received via the connection 230.

Figure 2B:
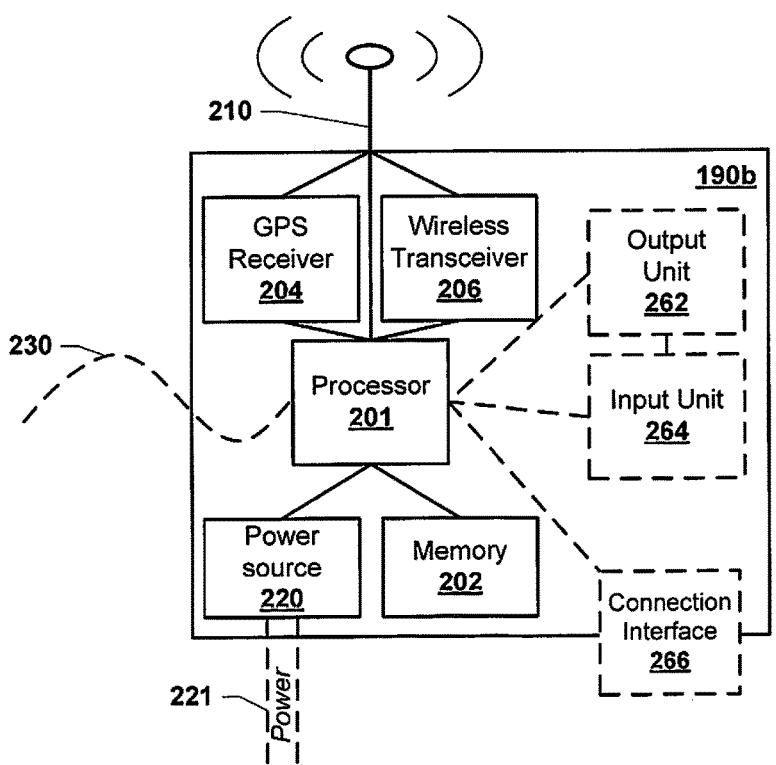

FIG. 2B illustrates another embodiment tracking device 190b that may be installed within a vehicle as described above. For example, the tracking device 190b may be installed on the dash of a tow truck associated with a repossession agent. As another example, the tracking device 190*b* may be installed within a borrower's vehicle such that it is hidden or not ready accessible to the borrower (e.g., under the hood, within a molding, etc.). Coupled to a processor 201, the tracking device 190*b* may include a GPS receiver 204, a wireless transceiver 206 (e.g., cellular network transceiver, Wi-Fi radio, etc.), and antennae 210 for sending and receiving electromagnetic signals. The transceiver 206 and antennae 210 may be used with the above-mentioned circuitry to implement the various wireless transmission protocol stacks and interfaces. The tracking device 190*b* may further include a power source 220 (e.g., a battery, a plug or interface for receiving power from an external power outlet, etc.) and a memory 202 coupled to the processor 201. For example, the tracking device 190*a* may include a lithium battery or alternatively may be plugged into an automobile battery via a permanent connection 221. As discussed above, the memory 202 may be volatile or non-volatile memory, and may also be secure and/or encrypted memory, or unsecure and/or unencrypted memory, or any combination thereof, for example, a SIM. In other embodiments, a separate SIM in addition to the memory 202 may be included in the tracking device 190*b*.

In some embodiments, the tracking device 190*b* may also include an output unit 212 coupled to the processor 201 and capable of rendering, emitting, or otherwise presenting information. The output unit 262 may be an LCD screen, an LED display, a light bulb, a speaker, or any combination of units for presenting text from messages received over a cellular network via the wireless transceiver 206. For example, the output unit 262 may be an LCD screen configured to render incoming messages from a tracking server (e.g., "You just passed a car to be repossessed for Lender X!," a picture of a new repossession assignment, a listing of the last five GPS locations of a car to be repossessed, etc.).

In some embodiments, the tracking device 190*b* may also include an input unit 264 coupled to the processor 201, such as a keyboard, a touch screen, a microphone, a mouse, or any combination of units for enabling a user to provide input data. For example, the tracking device 190*b* may include a touch screen (and touch screen controller), such as a resistive-sensing touch screen, capacitive-sensing touch screen, infrared sensing touch screen, etc., for receiving selection inputs on a graphical user interface (GUI). Further, the tracking device 190*b* may include a connection interface 266 coupled to the processor 201 and configured to enable the tracking device 190*b* to connect to and communicate with various peripherals, such as printer units. The connection interface 266 may be singularly configured to accept one type of connection, or multiply configured to accept various types of physical and communication connections, common or proprietary, such as USB, FireWire, Thunderbolt, or PCIe. In an optional embodiment, the tracking device 190*b* may also include a connection 230 to a computing device within a vehicle, such as a navigation system and/or a primary computer system configured to monitor and control the operations of an automobile (e.g., speed regulator, fuel injection, sensors, etc.). In some embodiments, the tracking device 190*b* may use the connection 230 to connect to the vehicle via a diagnostics connector (e.g., an OBD-II port, etc.) that may be typically used for interfacing with the vehicle systems for diagnostic purposes. In some embodiments, the connection interface 266 may be a connector compatible with an OBD-II connection. In some embodiments, the tracking device 190*b* may utilize the connection 230 to connect with audio/visual functionalities, systems, and/or devices of the vehicle, such as speakers systems or display units. The tracking device 190*b* may be configured to play audible or visual information for receipt by occupants of the vehicle, such as sound files (e.g., .wav files, .mp3 files, etc.) played over speakers that are embedded within the frame of the vehicle cabin. In some embodiments, control of such audio/visual functionalities may require the tracking device 190*b* to override other media concurrently playing via the native functions of the vehicle (e.g., override AM/FM radio over the speakers, turn on the speaker system, etc.).

In some embodiments, the tracking device 190*b* may be a mobile device, such as a smartphone as described above. For example, a smartphone used by a repossession agent may be configured to operate as a tracking device 190*b* by performing software or other operations on the processor 201 that relay GPS coordinates to and/or receive messages (e.g., offers for new repossession jobs) from a tracking server as described above.

In various embodiments, the components of a tracking device may be different dependent upon the type of vehicle in which it is installed and/or the purpose of the installation. For example, when installed within a borrower's car (e.g., a car having a lien from a banking institution, etc.) for the purpose of tracking the car's location for potential repossession, a tracking device 190*a* may not include an output unit 262 and/or an input unit 264, as the borrower may not need to receive or provide information to a tracking server through the tracking device 190*a*. Alternatively, when installed within a vehicle of a repossession agent, a tracking device 190*b* may include both the output unit 262 and the input unit 264 in order to enable repossession agents to view received information of new repossession assignments (e.g., newly assigned repossessions, offers for new repossession assignments, location information of items to be repossessed, etc.). However, in some embodiments, the output or input components of the tracking device 190*b* may be required to interactively communicate with borrowers, and thus may be installed within a vehicle associated with a borrower. For example, in order for a tracking server to transmit messages that cause warnings or other informative signals to be played for borrowers in-default (e.g., buzzes indicating an in-default account, within distance of a payment center, etc.), a borrower's vehicle may include a tracking device 190*b* that includes a connection to the vehicle's speaker system capable of emitting audio generated by the tracking device 190*b* playing a sound file (e.g., .wav file, etc.) received from the tracking server.

In various embodiments, the tracking devices 190*a*, 190*b* may be configured to store credentials within the memory 202. For example, the tracking device 190*a* installed within a borrower's vehicle may store a unique identifier that may be transmitted within messages over the Internet to a server (e.g., tracking server 110 described above) enabling the server to cross-reference the messages with stored account profiles. As another example, the tracking device 190*b* installed in a repossession agent vehicle may be configured to store log-in credentials that may be used to log-in to a tracking server over the Internet. Using such stored information, tracking devices 190*a*, 190*b* may be configured to periodically and continually transmit updated information that may be associated with the tracking devices 190*a*, 190*b* at a server, but also receive data from the server without additional log-in procedures required of personnel. In various embodiments, a telephone number and static IP address assigned to the tracking devices 190*a*, 190*b* may be stored in the memory 202. The telephone number may be initially assigned when the tracking devices 190*a*, 190*b* are installed and may be re-assigned by communications with a wireless network. The static IP address may be permanently assigned to the tracking devices 190a, 190b and may not change even though the telephone number may be reassigned.

In some embodiments, tracking devices may utilize plug-and-play technologies and/or components. For example, a tracking device itself may be configured to be plugged into a universal serial bus (USB) and/or a OBD-II connection of a vehicle. As another example, the tracking device may be configured to couple to or otherwise include a plug-and-play buzzer unit (or other output units) capable of emitting sounds and/or vibrations. In some embodiments, tracking devices may not initially include buzzer units, but instead may be configured to optionally connect to plug-and-play buzzer units at an arbitrary time after installation. With such plug-and-play functionalities, tracking devices may communicate with the various systems of vehicles to gather or otherwise identify data, such as miles traveled and other data that may be useful for insurance and leasing purposes (e.g., compare data with predefined mileage, etc.).

In some embodiments, tracking devices may be devices that are hard-wired into vehicles. Such tracking devices may be enabled to wirelessly communicate, utilize the buzzer functionalities, and/or perform other operations via the vehicles' power sources.

Figure 2C:
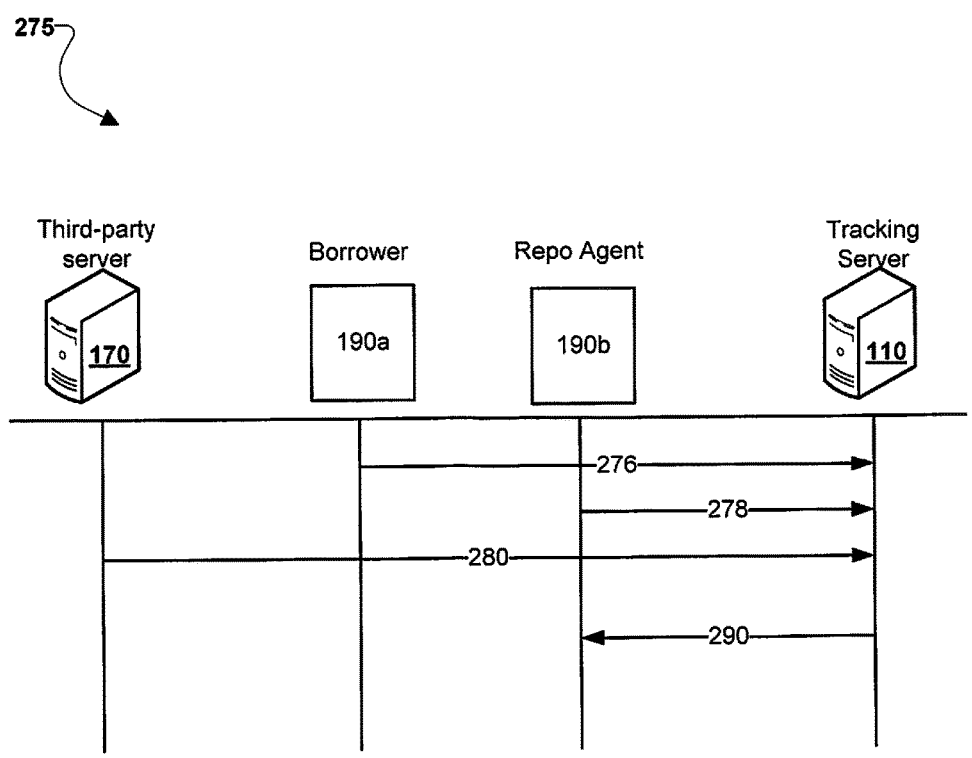
FIG. 2C is a call flow diagram illustrating embodiment communications between a server and various devices.

FIG. 2C illustrates an embodiment call flow 275 of the communications between a tracking server 110 and various devices. As described above, the tracking server 110 may be configured to exchange communications via Internet protocols from a plurality of tracking devices. In particular, the tracking server 110 may be configured to periodically receive messages 276 from a borrower tracking device 190a, such as messages that indicate the current GPS coordinates of the vehicle in which the borrower tracking device 190a is installed, as well as messages 278 from a repossession agent tracking device 190b, such as messages that indicate the current GPS coordinates of the vehicle in which the repossession agent tracking device 190b is installed. The tracking server 110 may also be configured to receive messages 280 from a third-party server, such as messages from a bank indicating a set of accounts that may or may not be currently in-default. In various embodiments, the messages 280 may indicate the identifiers of accounts or borrowers, as well as repossession instructions or parameters to be used by the tracking server 110 when assigning repossession assignments to repossession agents. The processor of the tracking server 110 may evaluate, store, and otherwise process the data within the messages 276, 278, 280. In response, the tracking server 110 may transmit messages 290 to the repossession agent tracking device 190b that include information related to repossession assignments, such as the contract for repossessing the car associated with the borrower tracking device 190a.

Figure 2D:
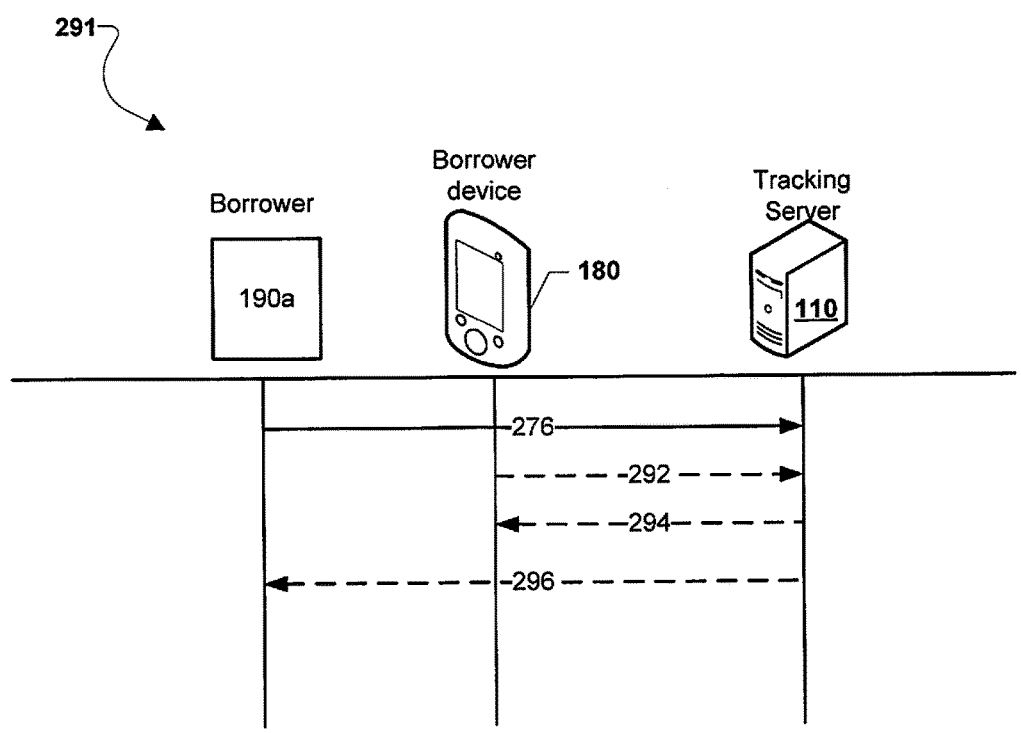
FIG. 2D is a call flow diagram illustrating embodiment communications between a server and devices associated with a borrower (or "borrower devices").

FIG. 2D illustrates an embodiment call flow 291 of the communications between a tracking server 110 and various devices associated with a borrower. In particular, a borrower may be associated with both a borrower tracking device 190a within a vehicle as well as a mobile device 180 (e.g., a borrower's smartphone). As described above, the borrower tracking device 190a may be configured to periodically transmit information (e.g., GPS coordinates) via messages 276 to the tracking server 110. In some embodiments, the mobile device 180 may also be configured to periodically transmit information to the tracking server 110, such as location information (e.g., GPS coordinates). The mobile device 180 may transmit such information to the tracking server 110 via messages 292, such as communications over a cellular network. In response to receiving the messages 276 from the borrower tracking device 190a and/or the messages 292 from the mobile device 180, the tracking server 110 may be configured to process the data within the messages 276, 292 and generate response messages 294, 296 to the borrower tracking device 190a and/or the mobile device 180, respectively. For example, based on processing GPS coordinates received from both the mobile device 190 and the borrower tracking device 190a, the tracking server 110 may determine the borrower is within the vehicle associated with the borrower tracking device 190a, and thus may send a message to the mobile device 180 instructing the borrower to stop off at a garage for maintenance and/or to return the vehicle to a payment location to surrender the vehicle and/or make a payment on an in-default account. Such messages 294, 296 may include various indicators of account status (e.g., in-default, near a mileage maximum/cap, etc.) associated with the borrower tracking device 190a. Further, the messages 294, 296 may include executable data (e.g., digital files, commands, etc.) that may cause the borrower tracking device 190a and/or the mobile device 180 to perform various operations, such as a message causing the tracking device 190a to play a sound file (e.g., a .wav file) from the vehicle's speaker system and/or emit a buzzing noise from an internal speaker.

Figure 3:
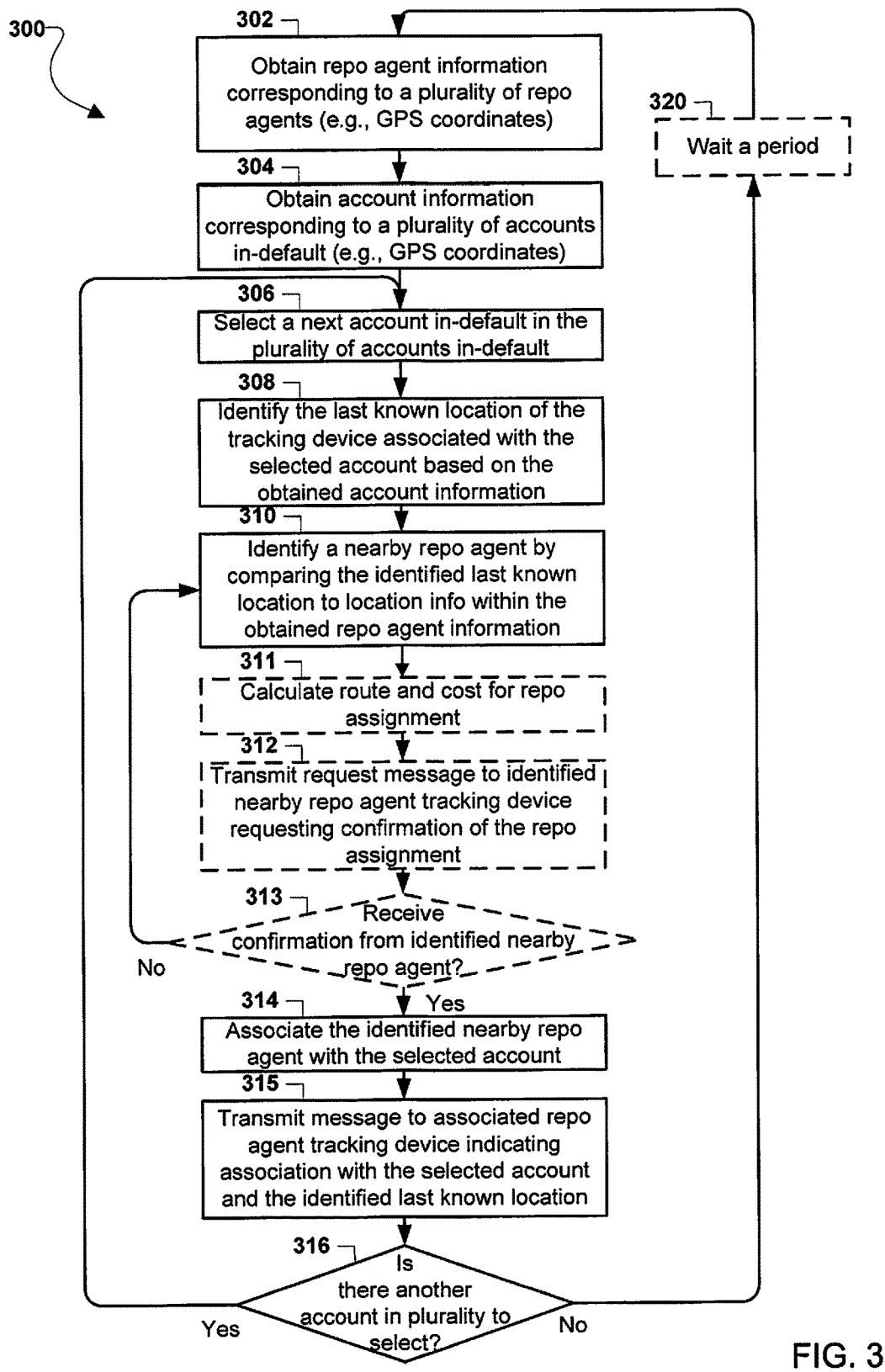
FIGS. 3 and 4 are process flow diagrams illustrating embodiment methods for a server to transmit messages to a plurality of repossession agent tracking devices near property associated with a plurality of accounts in-default.

FIG. 3 illustrates an embodiment method 300 for a server to transmit messages to repossession agent tracking devices near borrower tracking devices associated with accounts in-default. The method 300 may be performed so that accounts in-default (e.g., car loan accounts that have breached repayment terms, etc.), may be handled in batches. For example, on a periodic basis (e.g., every minute, hour, day, etc.), messages assigning repossession jobs to nearby repossession agents may be transmitted corresponding to in-default accounts for various lenders registered with the server. With such a technique, the server may be configured to efficiently process repossession assignments for large numbers of accounts in-default. In various embodiments, the operations of the method 300 may be performed by a tracking server or a combination of servers as described above.

In block 302, a processor of the server may obtain repossession agent information corresponding to a plurality of repossession agents. In other words, the server may obtain information describing the various personnel, tracking devices, business practices, and other current information related to repossession agents registered to receive repossession assignments from the server. In particular, repossession agent information may include location information, such as the current GPS coordinates, for repossession agent tracking devices installed within the vehicles of repossession agents. For example, the obtained repossession agent information may include the GPS coordinates for every repossession agent tow truck having a tracking device that is registered with the server. The repossession agent information may be important in that it may indicate an up-to-date and precise location of repossession agents that may be available to repossess assets (e.g., cars with loans in default, etc.) within a particular area. In various embodiments, the server may obtain (or receive) updated repossession agent information for each of the known or registered repossession agent tracking devices on a periodic basis (e.g., once every minute, hour, day, etc.). For example, new GPS coordinates for various repossession agent tracking devices may be received every few minutes.

The repossession agent information may include various characteristics of individual repossession agents associated with repossession agent tracking devices. For example, in addition to the most recently reported GPS coordinates for individual repossession agent tracking devices, the repossession agent information may include records that indicate the vehicle type, recent activity (e.g., completed repossession assignments, amount of damage incurred during previous repossession assignments, etc.), status (e.g., on active duty, on a break, suspended, etc.), the number of repossession agents associated with the device (e.g., a driver and an additional person, only a single person, a team, etc.), efficiency information (e.g., average time to complete repossession assignments, success rate, etc.), an applicable geographical area (e.g., a metropolitan area, a neighborhood, etc.), and other repossession assignment qualifiers (e.g., type of vehicles that may be repossessed by the personnel associated with the tracking device, permits, legal status, etc.).

In some embodiments, the repossession agent information may include data related to the business operations or capabilities of a repossession service or agent. For example, the repossession agent information may include data indicating the overhead for the repossession service, the number of average repossession assignments per period (e.g., week, month, quarter, year, etc.), pricing information related to repossession assignments, and other information that may indicate the relevance of a repossession service to a particular repossession assignment (e.g., established connections with skip tracers and/or law enforcement of an area, etc.).

In some embodiments, the repossession agent information may be obtained by receiving messages from repossession agent tracking devices (e.g., messages with up-to-date GPS coordinates), receiving messages from remote data sources (e.g., data from third-party servers, repossession agent computers, etc.), and/or information previously received and stored within the server. For example, the server may receive (or download) via the Internet data from a third-party server (or cloud server) that maintains up-to-date location information (e.g., GPS coordinates), statistics, and business information (e.g., licenses, contracts, active repossession assignments, etc.) for all repossession services having repossession agent tracking devices. As another example, the server may obtain the repossession agent information from a local data source, such as a local database, drive, or disk. In other words, the server may be a hub or platform that processes all information related to tracking devices of repossession agents. For example, the server may be configured to store a database of profiles associated with each repossession agent (and/or repossession agent tracking device) that is periodically updated with new GPS coordinates and activity information of the various repossession agents. As another example, the server may be configured to process and store GPS coordinates within messages directly received from repossession agent tracking devices over time. In various embodiments, the server may be configured to decode, decrypt, or otherwise process the obtained repossession agent information.

In block 304, the processor of the server may obtain account information corresponding to a plurality of accounts in-default. As described above, an account in-default may be a record associated with an item (e.g., a car, boat, etc.) that is subject to a financing agreement (e.g., a car loan), where the terms of the financing agreement have been breached by a borrower (i.e., the borrower has failed to make his scheduled payments to a car loan creditor/lender/bank and thus has "defaulted"). Obtained account information may include various information related to the borrower, property related to financing agreements, and the financing agreements themselves. In particular, account information for a certain borrower may include a profile (i.e., a record or set of records) that indicates the borrower related to property subject to a financing agreement, a description of the property (e.g., identifying information such as the make, model, year, color, after-market upgrades/adjustments, license number, known body damage, etc.), and the latest location information that the property (e.g., GPS coordinates reported by a tracking device within the property). For example, the account information related to a certain borrower may include the borrower's street address, a description of a car subject to an outstanding loan, and the last known GPS coordinates of the car. The location information within the account information may include GPS coordinates received from a corresponding borrower tracking device over a period of time. For example, the account information may include the last five received GPS coordinates or alternatively a set of GPS coordinates received over the last week, month, year, etc. The account information may further include the borrower's personal information (e.g., name, age, physical descriptions, etc.), contact information (e.g., address(es), phone number(s), etc.), employment information (e.g., place of business, address of business, occupation, salary, typical work hours, etc.), financial information (e.g., banking data, etc.), and debt information (e.g., repayment status regarding loans, terms/conditions to agreements, collateral, payment schedules, etc.).

Similar to as described above with reference to the operations in block 302, the account information may be obtained by receiving messages from borrower tracking devices (e.g., messages with up-to-date GPS coordinates), receiving messages from remote data sources (e.g., account status information from loan servicing computers, etc.), and/or information previously received and stored within the server. For example, the server may obtain the account information on a periodic basis in part by downloading via the Internet data from a third-party server (or cloud server) that maintains up-to-date location information about loans, borrowers, and the location information of tracking devices of items associated with the accounts (e.g., GPS coordinates of borrower tracking devices within automobiles). As another example, the server may obtain the account information from a local data source, such as a local database, drive, or disk. In other words, the server may be a hub or platform that processes all information related to tracking devices within property subject to financing agreements of registered lenders (e.g., banks, car lots, etc.). For example, the server may be configured to store a database of profiles associated with borrower and/or vehicle currently under a financing agreement that involves a bank registered to use the server's tracking services. In such an embodiment, the server may be configured to periodically receive and update the database of profiles with new GPS coordinates and activity information of the various accounts. For example, the server may be configured to process and store GPS coordinates within messages directly received from asset tracking devices over time. As another example, the server may be configured to receive updated account status information of loans, such as data indicating whether car loans are in-default at a given time or whether breaches have been cured by borrower actions. In various embodiments, the server may be configured to decode, decrypt, or otherwise process the obtained asset account information. In various embodiments, the server may obtain (or receive) account information for each of the known or registered borrower tracking devices on a periodic basis (e.g., once every minute, hour, day, etc.).

The obtained account information may correspond to a large batch of accounts in-default that relate to a plurality of borrowers, properties, lenders, and/or geographical locations. Accordingly, the server may be configured to iteratively handle each account in-default, and may select a next account in-default in the plurality of accounts-in-default in block 306. For example, when the operations in the method 300 are first executed by the processor of the server, the next account in-default may be the first in the plurality of accounts in-default.

In block 308, the processor of the server may identify the last known location of the tracking device associated with the selected account (or the "borrower tracking device") based on the obtained account information. For example, the server may perform a look-up within a database record associated with a certain vehicle to identify data indicating the last GPS coordinates of the vehicle as reported by its connected borrower tracking device.

In block 310, the processor of the server may identify a nearby repossession agent (or repossession agent tracking device) by comparing the identified last known location to location information within the obtained repossession agent information. For example, the server may compare the last known GPS coordinates of a car having a loan in-default with the GPS coordinates for all repossession agent tracking devices registered with the server, and may identify a repossession agent tracking device that is the shortest distance from the last known GPS coordinates of the car. In some embodiments, the server may identify the nearby repossession agent tracking device based on both location information and status information (e.g., currently busy, skill/success rating, etc.). For example, the server may determine that a first repossession agent tracking device may be the shortest distance from the last known location of the borrower tracking device of the selected account at a given time, however may identify a second repossession agent tracking device as the nearby repossession agent when the repossession agent information associated with the first repossession agent indicates the first repossession agent is associated with too many repossession assignments at the given time. As another example, the server may identify the nearby repossession agent as the agent that has the highest success rate for repossessing cars and is within a tolerance threshold distance from the last known location of the borrower tracking device. In various embodiments, the server may identify the nearby repossession agent based on GPS coordinates of repossession agent tracking devices, such as current GPS coordinates from tracking devices within tow trucks of registered repossession agents, or alternatively based on general location information of registered repossession agents/services, such as the business address of a repossession agent.

In optional block 311, the processor of the server may calculate a route and cost for the repossession assignment. For example, the server may generate a path or series of turns on roads that may be used by the repossession agent to arrive at the vehicle to be repossessed. Routes may be one-way or round-trip. Further, routes may be from predefined locations of repossession agents (e.g., the address or geofence associated with a repossession yard or place of business) and/or with a current location of a repossession agent vehicle in the field at a given time. The costs may include travel costs (e.g., fuel, mileage, tolls, time-to-complete, etc.) that may be incurred by the repossession agent when traveling the calculated route. Such information may be valuable for repossession agents to use in determining whether to accept the repossession assignment.

In optional block 312, the processor of the server may transmit a request message to the identified nearby repossession agent tracking device requesting confirmation of the repossession assignment. For example, the server may transmit a message indicating the identified nearby repossession agent has been identified as the best choice to handle the repossession assignment for the in-default account and may request that the repossession agent reply to accept the assignment. This optional operation may be performed to avoid associating the identified nearby repossession agent with the selected in-default account when the repossession agent is not capable of executing the repossession in an acceptable manner (e.g., the repossession agent is actually off-duty, has too many jobs, is actually not near the last known address, etc.). In some embodiments, the transmitted request message may also include the calculated information (e.g., cost, route, etc.) performed in optional block 311.

For the purposes of non-limiting illustration: at a given time, the server may determine that a repossession agent truck has passed a car to be repossessed while driving through a parking lot. In response, the server may transmit a request message to the tracking device within the repossession agent truck that includes text information asking, "Do you want an assignment to repossess the car yellow car you just passed with the license plate ABCXYZ?" In this way, the method 300 may be performed by the server to dynamically present repossession assignments to repossession agents as they move within a certain distance of property. As indicated above, various forms of communication, for instance SMS text messaging, may or may not be utilized based on applicable laws or regulations.

In optional determination block 313, the processor of the server may determine whether a confirmation message from the identified nearby repossession agent tracking device is received. For example, the server may determine whether the identified repossession agent accepted the repossession assignment in response to receiving the request message. If the server does receive a confirmation message from the identified repossession agent tracking device (i.e., optional determination block 313="Yes"), the server may continue with the operations described below with reference to block 314. However, if the server does not receive a confirmation message from the identified repossession agent tracking device (i.e., optional determination block 313="No"), the server may continue with the operations in block 310 by identifying another nearby repossession agent, such as the next closest agent to the identified last known location.

In block 314, the processor of the server may associate the identified nearby repossession agent with the selected account. For example, the server may store data within a database indicating the identified nearby repossession agent has been awarded the repossession assignment for the car associated with the selected account in-default. The association of an in-default account with a repossession agent may be considered awarding a repossession assignment to that repossession agent, and thus may include initiating a repossession contract between the repossession agent and the lender associated with the related in-default account. In various embodiments, the server may associate the nearby repossession agent with the selected account by updating a data field within the select account to include an identifier of the nearby repossession agent. In some embodiments, the server may associate one or more repossession agents (or repossession agent tracking devices) with the selected account in-default.

In block 315, the processor of the server may transmit a message to the associated repossession agent tracking device indicating the association with the selected account and the identified last known location. In other words, the server may notify the repossession agent that the repossession assignment has been awarded by transmitting information to the repossession agent tracking device for display. For example, the server may transmit an email, an SMS text message, or some other proprietary communication over the Internet for receipt by the repossession agent tracking device via a long-range wireless signal transceiver, and in response, the repossession agent tracking device may render a message on an LCD screen. The transmitted message may include various information that may be useful in executing the repossession assignment, such as the description of the property to be repossessed (e.g., license plate number, paint color, etc.), the last known GPS coordinates, the speed and direction of travel (if any), whether the borrower is a registered gun owner, known behavioral patterns of the property and/or the borrower (e.g., daily schedule), etc. The transmitted message may also include billing or pricing information, such as the amount of money the repossession assignment is worth to the nearby repossession agent. In some embodiments, the transmitted message may further include contract or legal information, such as an agreement or terms of a relationship between a lender associated with the selected in-default account and the nearby repossession agent. For example, the transmitted message may include legal documents indicating that a lender authorizes the nearby repossession agent to repossess property associated with the selected in-default account. In some embodiments, the transmitted message may also include a number of previous locations of the borrower tracking device associated with the selected in-default account. For example, the server may transmit the identified last known location along with the previous five (5) locations associated with the in-default account.

In determination block 316, the processor of the server may determine whether there is another account in-default to select in the plurality of in-default accounts. If there is another account to select (i.e., determination block 316="Yes"), the server may continue with the operations in block 306 by selecting the next account in-default. However, if there is not another account to select (i.e., determination block 316="No"), in optional block 320, the processor of the server may wait a period, such as a predefined number of milliseconds, seconds, minutes, etc., and then may continue with the operations for obtaining repossession agent information in block 302.

The method 300 may be beneficial in that it may be employed by the server to systematically restrict what repossession agents may access. In other words, individual repossession agents may only receive information about in-default accounts and/or property that is associated and assigned to those repossession agents by the server. Thus, the method 300 provides greater convenience to repossession agents by delimiting the information they may see at any given time. Further, the method 300 provides greater privacy to lenders and borrowers, as potentially sensitive account information may only be transmitted to repossession agents having contracts to repossess property of in-default accounts (i.e., only associated repo men may receive account information).

Figure 4:
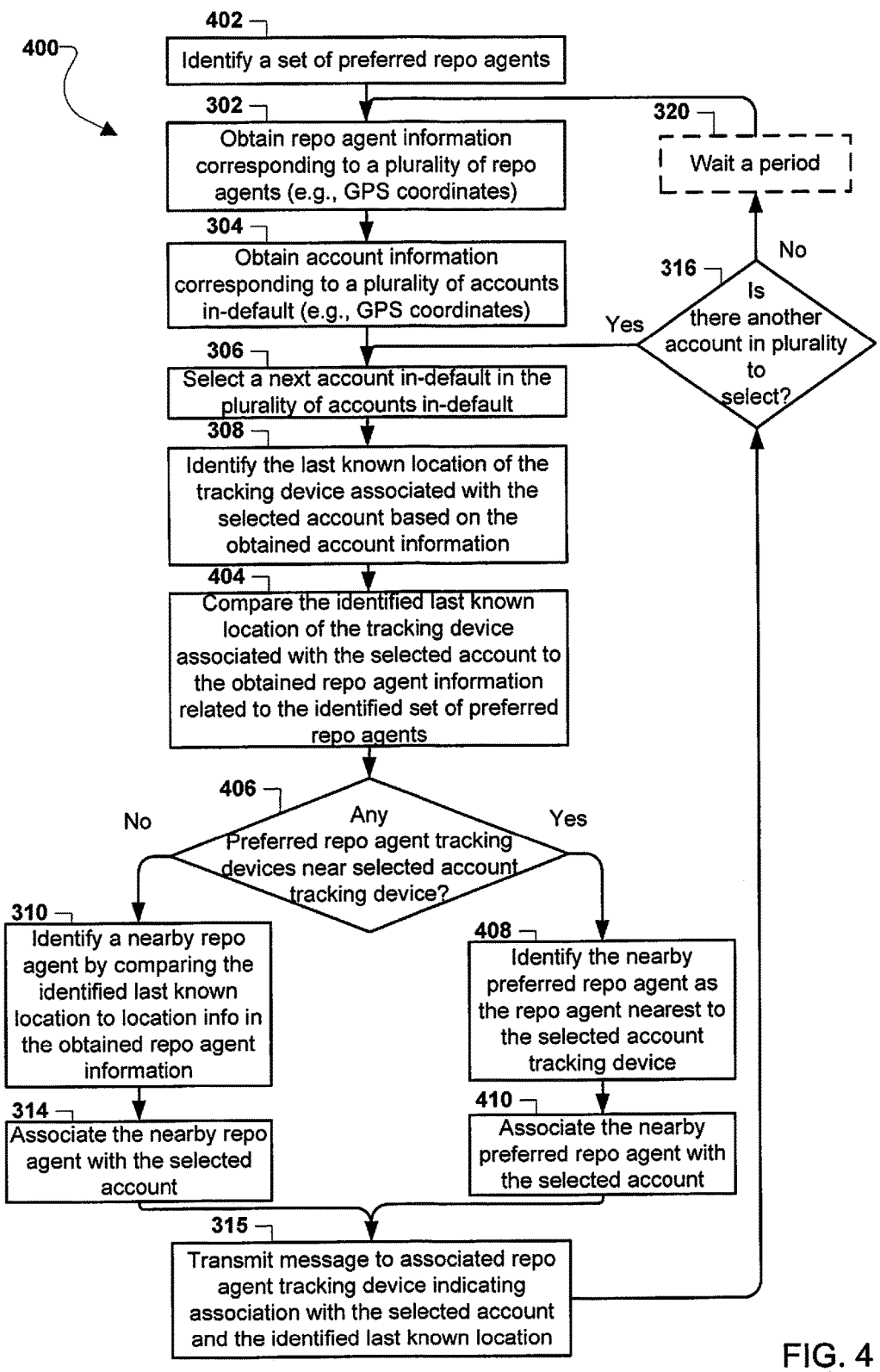

FIG. 4 illustrates an embodiment method 400 for a server to transmit messages to repossession agent tracking devices near borrower tracking devices associated with accounts in-default. The method 400 is similar to the method 300 described above, except that the method 400 may include operations for identifying a nearby repossession agent that is a preferred agent. In other words, the server may be configured to differentiate between types of registered repossession agents and may associate repossession assignments so that preferred repossession agents may be prioritized over non-preferred services or agents. For example, a first repossession company may be affiliated with a particular lender that has an interest in a car loan currently in-default (i.e., the first repossession company is a preferred repossession agent for the lender), and thus the server may determine that the first repossession company should receive a repossession assignment related to the car loan instead of a second repossession company that does not have a pre-existing affiliation with the lender. In various embodiments, the operations of the method 400 may be performed by a tracking server or a combination of servers as described above.

The operations of blocks 302-308, 310-316, 320 included in the method 400 may be similar to as described above with reference to FIG. 3. In block 402, the processor of the server may identify a set of preferred repossession agents. In general, preferred repossession agents may have priority over non-preferred repossession agents, and thus may be assigned, associated, and/or awarded repossession assignments over non-preferred repossession agents. For example, the server may assign a new repossession assignment to repossess a car corresponding to a car loan from a lender that is in-default to a first repossession agent having preferred status regarding the lender. The server may make this identification based on stored information indicating the preferred status of all repossession agents registered with or otherwise known by the server. For example, the server may perform a query or look-up operation on a database of all known repossession companies and obtain a subset of entries corresponding to companies that have been pre-defined as preferred. In some embodiments, the server may identify the set based on evaluating previously obtained repossession agent information, as described above with reference to block 304.

Such a preferred status may be based on the relationships between lenders, repossession agents, and the server. For example, a first repossession agent may have a preferred status based on a contractual relationship with a certain bank. In various embodiments, the server may identify repossession agents that are preferred to all lenders, or alternatively, may identify repossession agents that are preferred to particular lenders. For example, the server may identify that a first repossession agent has a preferred status regarding a first lender, but may identify that a second repossession agent may have a preferred status regarding a second lender.

As described above, the processor of the server may obtain repossession agent information corresponding to a plurality of repossession agents in block 302, such as up-to-date GPS coordinates for repossession agent tracking devices of repossession agents registered with the server. In block 304, the processor of the server may obtain account information corresponding to a plurality of accounts in-default, such as up-to-date GPS coordinates of borrower tracking devices associated with accounts in-default. The processor of the server may be configured to iteratively handle each account in-default, and may select a next account in-default in the plurality of accounts-in-default in block 306. In block 308, the processor of the server may identify the last known location of the tracking device associated with the selected account (or the "borrower tracking device") based on the obtained account information.

In block 404, the processor of the server may compare the identified last known location of the tracking device associated with the selected account to the obtained repossession agent information related to the identified set of preferred repossession agents. In other words, the server may compare the borrower tracking device location to the locations of the tracking devices of preferred repossession agents. For example, the server may compare GPS coordinates of a car of an in-default car loan account to the GPS coordinates of all repossession agent tow trucks that have preferred status with the lender of the car loan.

In determination block 406, the processor of the server may determine whether any preferred repossession agent tracking devices are near the tracking device of the selected account. In other words, the server may determine whether any preferred repossession agents are within a distance threshold to the GPS coordinates of the borrower tracking device associated with the selected account in-default.

If it is determined there is a preferred repossession agent tracking devices near the selected account's tracking device (i.e., determination block 406="Yes"), in block 408 the processor of the server may identify a nearby preferred repossession agent (or repossession agent tracking device) as the repossession agent that is nearest to the selected account tracking device based on the operations as described above with reference to block 404. For example, by comparing the GPS coordinates of the preferred repossession agent tracking devices to the GPS coordinates of the borrower tracking device associated with the selected account in-default, the server may identify the preferred repossession agent tracking device within the shortest distance to the borrower tracking device.

In block 410, the processor of the server may associated the nearby preferred repossession agent with the selected account, such as by updating a stored value associated with the selected account to indicate an identifier of the nearby preferred repossession agent. However, if it is determined there are no preferred repossession agent tracking devices near the selected account's tracking device (i.e., determination block 406="No"), in block 310, the processor of the server may identify a nearby repossession agent by comparing the identified last known location to location information within the obtained repossession agent information, and in block 314, the processor of the server may associate the identified nearby repossession agent with the selected account.

In block 315, the processor of the server may transmit a message to the associated repossession agent tracking device indicating the association with the selected account and the identified last known location. In determination block 316, the processor of the server may determine whether there is another account in-default to select in the plurality of in-default accounts. If there is another account to select (i.e., determination block 316="Yes"), the server may continue with the operations in block 306 by selecting the next account in-default. However, if there is not another account to select (i.e., determination block 316="No"), in optional block 320, the processor of the server may wait a period, such as a predefined number of milliseconds, seconds, minutes, etc., and then may continue with the operations for obtaining repossession agent information in block 302.

For the purpose of simplicity, FIGS. 5-9 discuss operations for processing an account in-default. However, it should be appreciated that the operations of the methods of FIGS. 5-9 may be applied to a plurality (or batches) of accounts in-default, as described above. Further, FIGS. 5-9 illustrate embodiment methods that may be performed by a tracking server as described above.

Figure 5:
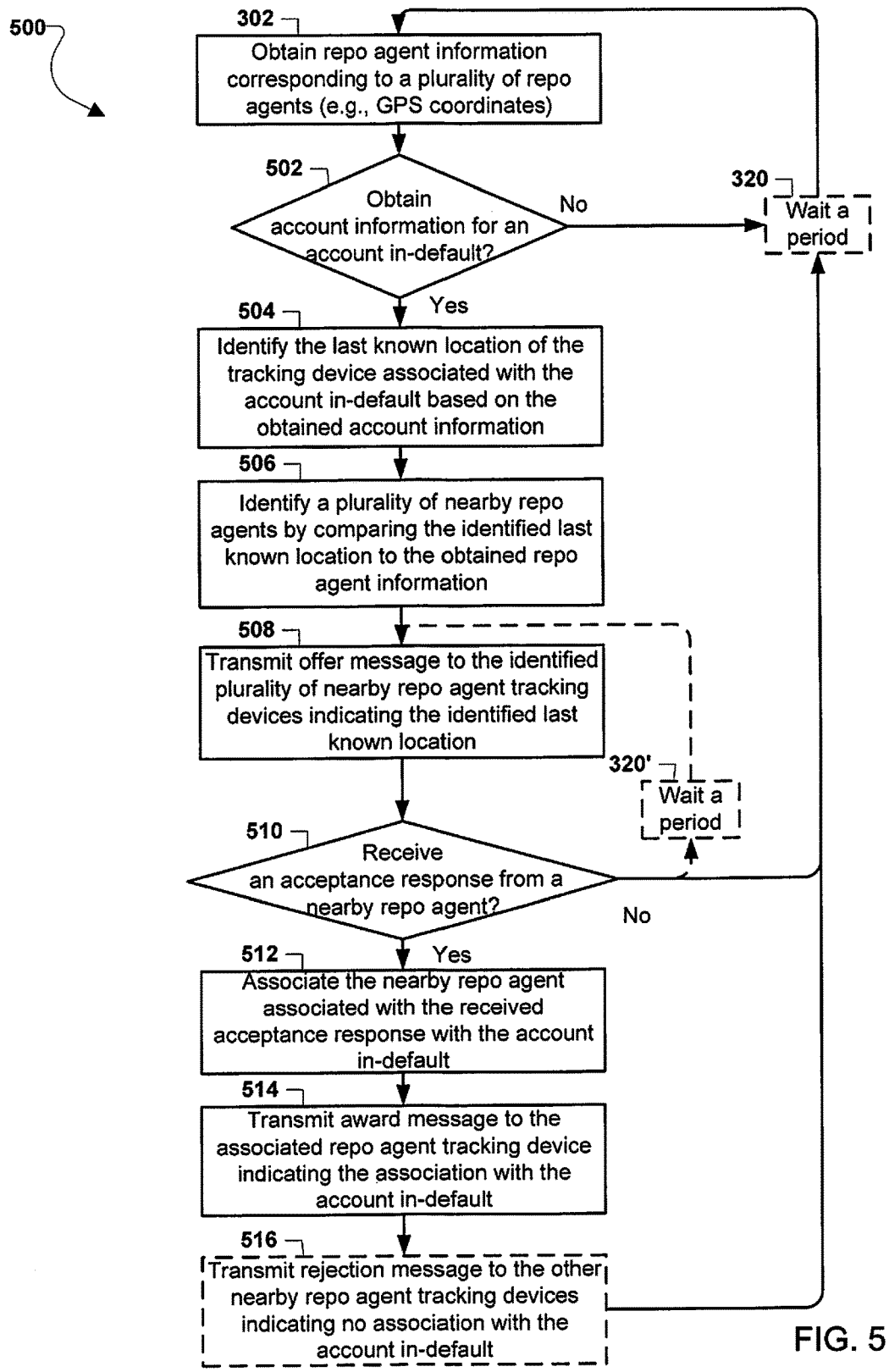
FIGS. 5, 6A, 6B are process flow diagrams illustrating embodiment methods for a server to transmit offer messages to various repossession agent tracking devices near property associated with accounts in-default.

FIG. 5 illustrates a method 500 for a server to transmit offer messages to various repossession agent tracking devices near borrower tracking devices associated with accounts in-default. In various scenarios, the server may enable an open market for nearby repossession agents to decide whether to accept repossession assignments. For example, instead of determining the repossession agent to recover a car related to an account in-default, the server may instead ask a community of repossession agents and award the repossession assignment to the repossession agent that wants the assignment. In other words, once a base eligibility is determined (e.g., within a certain distance threshold from the last known GPS coordinates of a car to be repossessed), the server may award repossession jobs to the first repossession agent to respond.

The operations of blocks 302 and 320 included in the method 500 may be similar to as described above with reference to FIG. 3. In block 302, the processor of the server may obtain repossession agent information corresponding to a plurality of repossession agents. In determination block 502, the processor of the server may determine whether account information for an account in-default has been obtained. For example, the server may determine whether it has received a message from a lender computing device indicating a car loan that is in-default and/or the updated GPS coordinates for the associated borrower tracking device. In various embodiments, the obtained account information may or may not include the location information of the account in-default. For example, the server may separately receive messages indicate borrower tracking device GPS coordinates and messages indicating a related account (e.g., car loan account) is now in-default. If it is determined that no account information for an account in-default is obtained (i.e., determination block 502="No"), in optional block 320 the processor of the server may wait a period and then may continue with the operations in block 302, such as by obtaining updated GPS coordinates for all repossession agent tracking devices of registered repossession agents.

However, if it is determined that account information for an account in-default is obtained (i.e., determination block 502="Yes"), in block 504 the processor of the server may identify the last known location of the tracking device associated with the account in-default (or the borrower tracking device) based on the obtained account information. The operations in block 504 are similar to the operations described above with reference to block 308.

In block 506, the processor of the server may identify a plurality of nearby repossession agents by comparing the identified last known location to the obtained repossession agent information. The operations in block 506 may be similar to the operations described above with reference to block in block 310 or block 404, except that the server may identify more than one repossession agent tracking device that is within a predefined distance threshold. For example, the server may compare the GPS coordinates of the borrower tracking device to the GPS coordinates of all repossession agent tracking devices to identify all repossession agent tracking devices within a certain number of miles from the borrower tracking device. The predefined distance threshold may be based on individual lender preferences. For example, the server may utilize a first distance threshold for a first lender and second distance threshold for a second lender based on preferences stored during the registration of the first and second lenders with the server. Such preferences may be stored within lender profiles that are accessible by the server, such as within a registration database.

In some embodiments, the server may utilize other predefined criteria to identify the plurality of nearby repossession agents. For example, based on stored preferences of a first lender, the server may identify all repossession agent tracking devices within a certain distance of the borrower tracking device location that are also priority or preferred agents of the first lender. As another example, the server may identify a plurality of repossession agents that are within a certain distance of the borrower tracking device and that have at least a certain success rate or percentage over a previous time period (e.g., at least a certain success rate over the previous year, etc.).

In block 508, the processor of the server may transmit an offer message to the identified plurality of nearby repossession agent tracking devices indicating the identified last known location of the tracking device associated with the selected account in-default. The offer message may include a unique identifier for the repossession assignment related to the account in-default and may further may indicate identifying information of the item to be repossessed (e.g., car make, model, license, color, etc.). The offer message may also include payment information, such as the bounty for the repossession assignment (e.g., a dollar amount a lender may pay for property to be repossessed). In some embodiments, the offer message may also include timing information, such as a time-to-live for the offer. For example, the offer message may indicate that any repossession agents receiving the offer message may reply within a number of minutes to be awarded the repossession assignment. In some embodiments, the offer message may also include information identifying the lender related to the account in-default, such as a unique identifier for a bank or car loan institution. In some embodiments, the offer message may include costs and route information as described above with reference to optional block 311 of FIG. 3.

In determination block 510, the processor of the server may determine whether an acceptance response message was received from a nearby repossession agent. The server may continually monitor for incoming messages from repossession agent tracking devices (or other computing devices associated with the nearby repossession agents), and may process any received message to detect whether the received message includes information indicating the account in-default. For example, the server may compare a unique identifier for the repossession assignment for the account in-default to header information or other metadata within the received response message to determine whether there is a match. If the server determines that an acceptance response from a nearby repossession agent is not received (i.e., determination block 510="No"), in optional block 320 the processor the server may wait a period, such as a millisecond(s), second(s), minute(s), etc., and then may continue with the operations in block 302 for obtaining updated repossession agent information. In an optional embodiment, if the server determines that an acceptance response from a nearby repossession agent is not received (i.e., determination block 510="No"), in optional block 320' the processor the server may wait a period and then may continue with the operations in block 508 for transmitting the offer message. In this way, the server may repeatedly transmit the offer message until one of the nearby repossession agents responds.

If the server determines that an acceptance response from a nearby repossession agent is received (i.e., determination block 510="Yes"), in block 512, the processor of the server may associate the nearby repossession agent associated with the received acceptance response with the account in-default. In other words, the server may award the repossession assignment of the account in-default to the first nearby repossession agent to send an acceptance message. In response to associating the repossession assignment with the responding repossession agent, in block 514 the processor of the server may transmit an award message to the associated repossession agent tracking device indicating the association with the account in-default, and in optional block 516 the server may transmit a rejection message to the other nearby repossession agent tracking devices indicating no association with the account in-default (i.e., the other repossession agents were not awarded the repossession assignment). The method 500 may continue with the operations in optional block 320 by the server waiting a period and then performing the operations in block 302 for obtaining repossession agent information, such as updated GPS coordinates for registered repossession agent tracking devices.

Figure 6A:
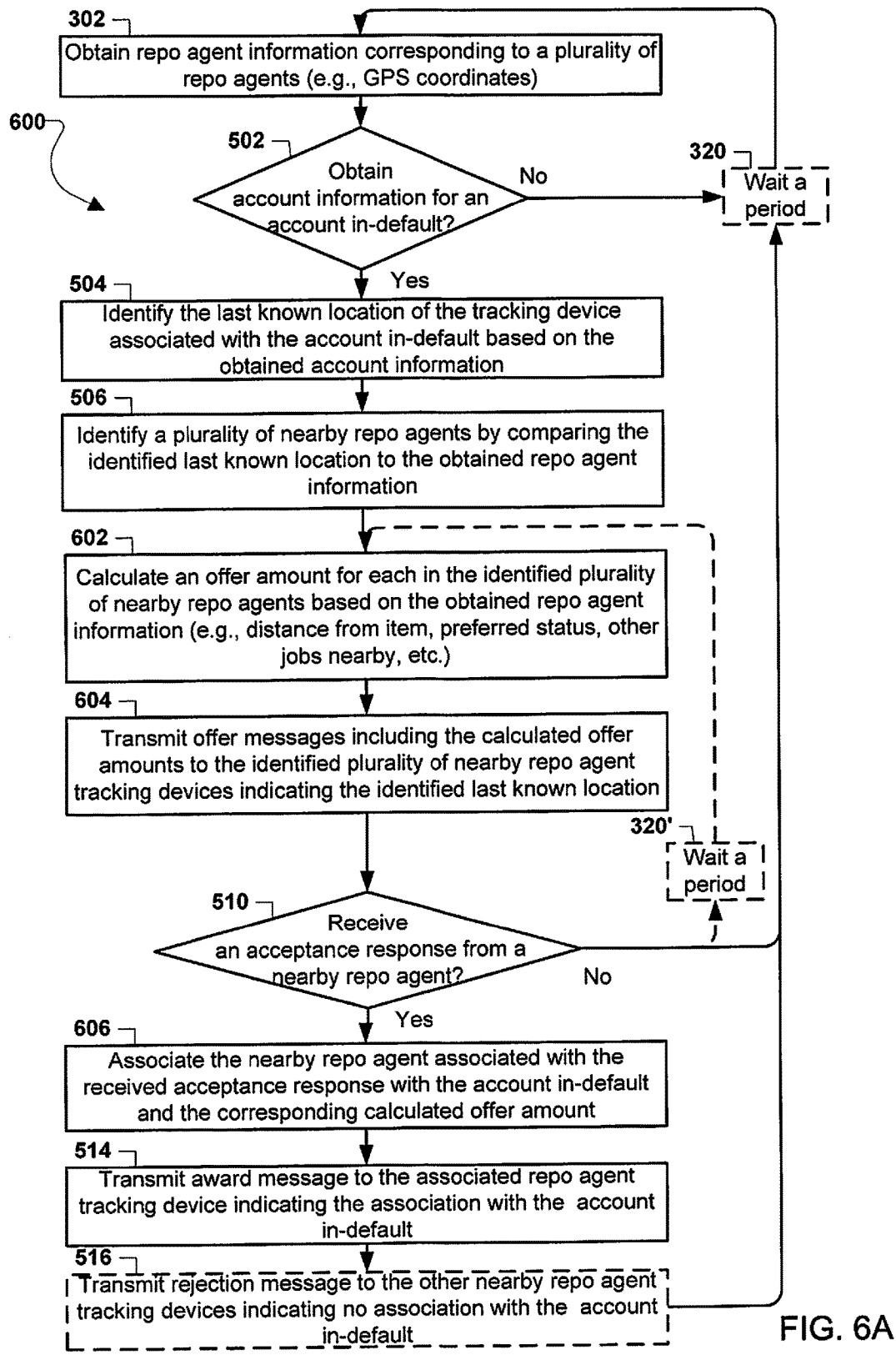

FIG. 6A illustrates a method 600 for a server to transmit offer messages to various repossession agent tracking devices close to tracking devices associated with accounts in-default. The method 600 is similar to the method 500 described above, except the method 600 may include operations for calculating offer amounts for each repossession agent identified as nearby to property to be repossessed. In other words, the server may be configured to transmit custom offers to repossession agents based on stored information. For example, the server may offer a repossession assignment to a first repossession agent for a bounty of a first amount and to a second repossession agent for a second amount based on the previous activities of the agents. This technique may be important for differentiating between different types of repossession agents that may be eligible to accept repossession assignments, enabling lenders to control the type of repossession agents that may accept assignments. Additionally, the server may perform the method 600 to calculate different offer amounts and batch transmit offers so that repossession agents that otherwise would be less desirable for carrying out repossession assignments (e.g., too far from property to be repossessed) may accept the assignments at offer amounts that are attractive to lenders.

The operations of blocks 302 and 320 included in the method 600 may be similar to as described above with reference to FIG. 3, and the operations of blocks 502-506, 510, 514-516 may be similar to as described above with reference to FIG. 5. In block 302, the processor of the server may obtain repossession agent information corresponding to a plurality of repossession agents. In determination block 502, the processor of the server may determine whether account information for an account in-default has been obtained. In some embodiments, the server may receive account information for accounts that are not in-default (e.g., periodically receiving GPS coordinates for a plurality of in-default or not in-default accounts). In such a case, the operations of determination block 502 may include the server evaluating accounts (or profiles) related to obtained account information (e.g., GPS data) to determine whether the accounts are in-default, such as by determining whether the accounts are past-due or include a flag or bit indicating the account is in-default. If it is determined that no account information for an account in-default is obtained (i.e., determination block 502="No"), in optional block 320 the processor of the server may wait a period and then may continue with the operations in block 302, such as by obtaining updated GPS coordinates for all repossession agent tracking devices of registered repossession agents. However, if it is determined that account information for an account in-default is obtained (i.e., determination block 502="Yes"), in block 504 the processor of the server may identify the last known location of the tracking device associated with the account in-default (or the borrower tracking device) based on the obtained account information. In block 506, the processor of the server may identify a plurality of nearby repossession agents by comparing the identified last known location to the obtained repossession agent information.

In block 602, the processor of the server may calculate an offer amount for each in the identified plurality of nearby repossession agents based on the obtained repossession agent information. In particular, the server may calculate custom offer amounts, or other conditions, based on the distance between a particular repossession agent tracking device and the last known location, the preferred status of the repossession agent, and other stored information related to the various repossession agents. For example, the server may calculate a lower offer amount (or bounty) for a first repossession agent when the obtained repossession agent information indicates the first repossession agent has an average success rate below a certain threshold. As another example, the server may calculate a lower offer amount (or bounty) for a second repossession agent than a first repossession agent when the second repossession agent tracking device is closer to the last known address and thus would require the second repossession agent to travel a shorter distance to perform the repossession. As another example, the server may calculate a higher offer amount when a repossession agent has a preferred status regarding the lender associated with the account in-default. As another example, the server may calculate a lower offer amount for a first repossession agent when the obtained repossession agent information indicates the first repossession agent has already accepted repossession assignments near the identified last known address for the account in-default. In various embodiments, the calculations may be affected or determined by rule sets and/or preferences predefined by the lender associated with the account in-default. For example, the lender preferences may indicate that the offer amount for a first repossession agent having a certain number of personnel may be lower (or higher) than the offer amount for a second repossession agent having a smaller number of personnel. In block 604, the processor of the server may transmit offer messages including the calculated offer amounts to the identified plurality of nearby repossession agent tracking devices indicating the identified last known location. The offer messages may be similar to the offer messages described above with reference to block 508, except that the offer messages transmitted in block 604 may be customized for each recipient repossession agent. In some embodiments, the offer messages may include costs and route information as described above with reference to optional block 311 of FIG. 3.

In determination block 510, the processor of the server may determine whether an acceptance response message was received from a nearby repossession agent. If the server determines that an acceptance response from a nearby repossession agent is not received (i.e., determination block 510="No"), in optional block 320 the processor the server may wait a period, such as a millisecond(s), second(s), minute(s), etc., and then may continue with the operations in block 302 for obtaining updated repossession agent information. In an optional embodiment, if the server determines that an acceptance response from a nearby repossession agent is not received (i.e., determination block 510="No"), in optional block 320' the processor the server may wait a period and then may continue with the operations in block 602 for calculate new offer amounts and then transmitting the new offer messages. In this optional embodiment, the server may continually adjust the offers (e.g., gradually increase the payment amount) until a repossession agent accepts the repossession assignment.

If the server determines that an acceptance response from a nearby repossession agent is received (i.e., determination block 510="Yes"), in block 606, the processor of the server may associate the nearby repossession agent associated with the received acceptance response with the account in-default and the corresponding calculated offer amount. For example, the server may store information indicating that the responding repossession agent is assigned to the account in-default for the bounty indicated in its custom offer message. In response to associating the repossession assignment with the responding repossession agent, in block 514 the processor of the server may transmit an award message to the associated repossession agent tracking device indicating the association with the account in-default, and in optional block 516 the server may transmit a rejection message to the other nearby repossession agent tracking devices indicating no association with the account in-default (i.e., the other repossession agents were not awarded the repossession assignment). The method 600 may continue with the operations in optional block 320 by the server waiting a period and then performing the operations in block 302 for obtaining repossession agent information, such as updated GPS coordinates for registered repossession agent tracking devices.

Figure 6B:
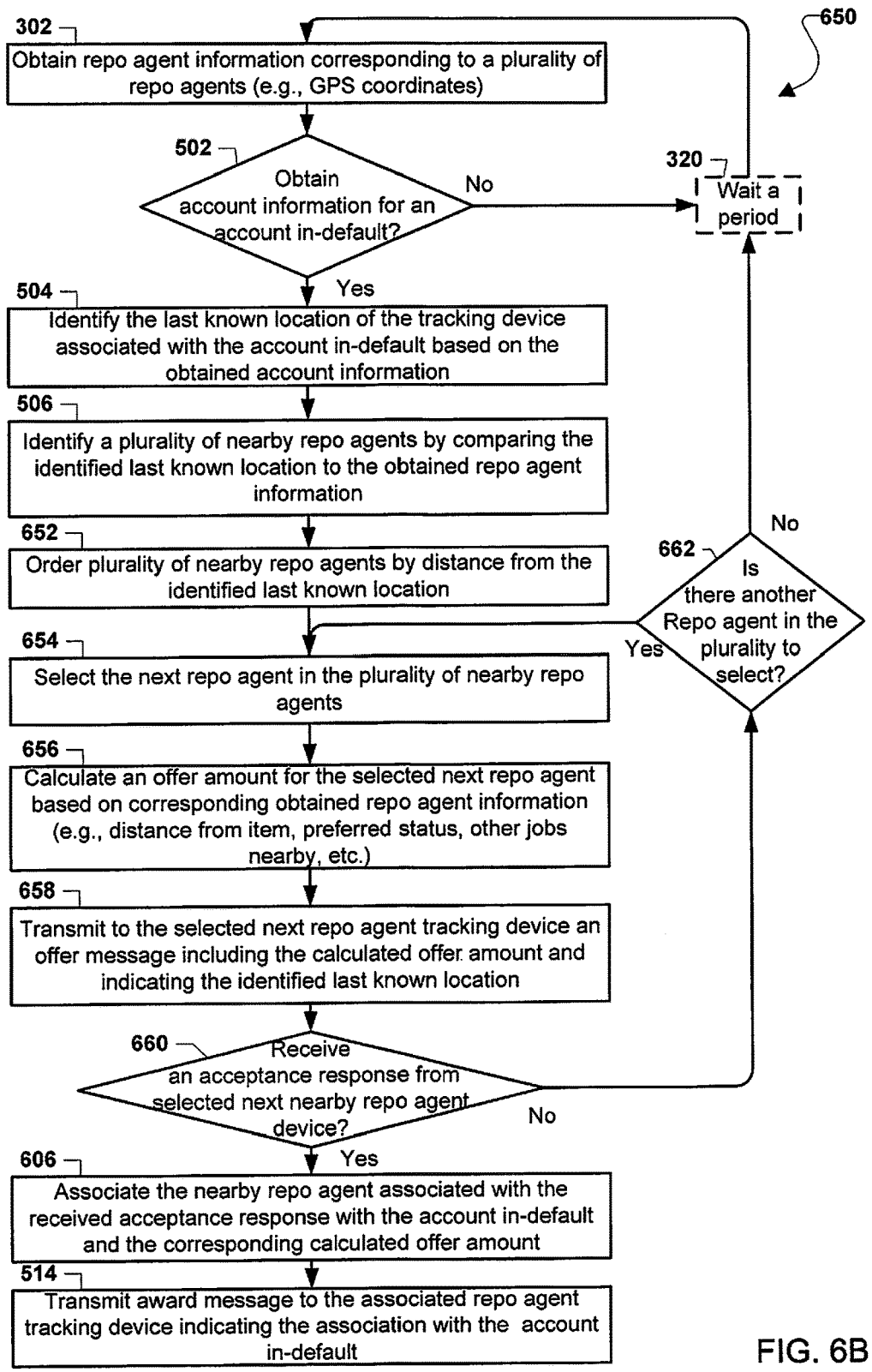

FIG. 6B illustrates a method 650 for a server to transmit offer messages to various repossession agent tracking devices close to tracking devices associated with accounts in-default. The method 650 is similar to the method 600 described above, except the method 650 may include operations for offering customer offers to repossession agents in order of preference or benefit to lenders. In this way, the server may enable lenders to give priority to closest repossession agents, but still provide flexibility in customizing offers for lesser priority repossession agents.

The operations of blocks 302 and 320 included in the method 650 may be similar to as described above with reference to FIG. 3, the operations of blocks 502-506, 514 may be similar to as described above with reference to FIG. 5, and the operations of block 606 may be similar to as described above with reference to FIG. 6A. In block 302, the processor of the server may obtain repossession agent information corresponding to a plurality of repossession agents. In determination block 502, the processor of the server may determine whether account information for an account in-default has been obtained. If it is determined that no account information for an account in-default is obtained (i.e., determination block 502="No"), in optional block 320 the processor of the server may wait a period and then may continue with the operations in block 302, such as by obtaining updated GPS coordinates for all repossession agent tracking devices of registered repossession agents. However, if it is determined that account information for an account in-default is obtained (i.e., determination block 502="Yes"), in block 504 the processor of the server may identify the last known location of the tracking device associated with the account in-default (or the borrower tracking device) based on the obtained account information. In block 506, the processor of the server may identify a plurality of nearby repossession agents by comparing the identified last known location to the obtained repossession agent information.

In block 652, the processor of the server may order the plurality of nearby repossession agents by distance from the identified last known location. In other words, the repossession agent tracking device with the shortest distance to the last known GPS coordinates of the borrower tracking device associated with the account in-default may be first in the ordering. In other embodiments, the server may utilize other information within the obtained repossession agent information to order the plurality, such as preferred status, success rate in previous repossession assignments, etc. In block 654, the processor of the server may select the next repossession agent in the plurality of nearby repossession agents, such as by selecting the first in the ordering, and in block 656 may calculate an offer amount for the selected next repossession agent based on the corresponding obtained repossession agent information. The operations in block 656 may be similar to the operations described above with reference to block 602, except the server may perform the operations in block 656 or only the selected next repossession agent. In block 658, the processor of the server may transmit to the selected next repossession agent tracking device an offer message including the calculated offer amount and indicating the identified last known location. In some embodiments, the offer message may include costs and route information as described above with reference to optional block 311 of FIG. 3. In determination block 660, the processor of the server may determine whether an acceptance response from the selected next nearby repossession agent tracking device was received at the server. If it is determined that no acceptance response was received from the selected next repossession agent tracking device (i.e., determination block 660="No"), in determination block 662 the processor of the server may determine whether there is another repossession agent in the plurality of nearby repossession agents to select. If there is another to be selected (i.e., determination block 662="Yes"), the server may continue with the operations in block 654 by selecting the next repossession agent. However if there is no other to select (i.e., determination block 662="No"), the server may continue by waiting a period in the optional block 320 and continuing with the operations in block 302.

If it is determined that an acceptance response was received from the selected next repossession agent tracking device (i.e., determination block 660="Yes"), in block 606, the processor of the server may associate the nearby repossession agent associated with the received acceptance response with the account in-default and the corresponding calculated offer amount. In response to associating the repossession assignment with the responding repossession agent, in block 514 the processor of the server may transmit an award message to the associated repossession agent tracking device indicating the association with the account in-default. In this way, no rejection messages may be necessary, as offer messages may be transmitted one at a time.

Figure 7:
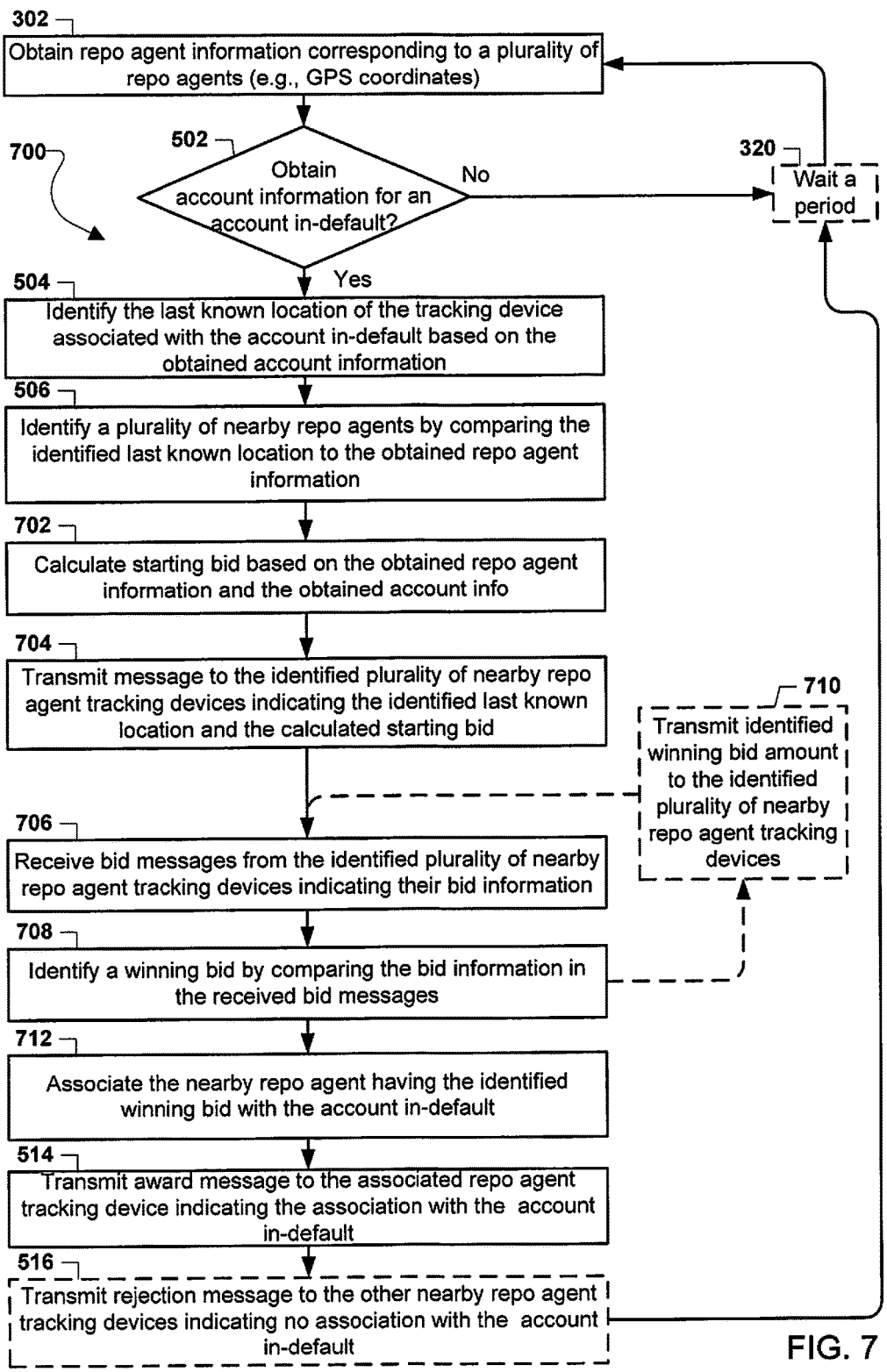
FIG. 7 is a process flow diagram illustrating an embodiment method for a server to enable an auction by awarding repossession assignments in response to receiving bids from various nearby repossession agents.

FIG. 7 illustrates a method 700 for a server to enable an auction by awarding repossession assignments in response to receiving bids from various repossession agents. The method 700 is similar to the method 500 described above, except the method 700 may include operations for initiating a bidding process in order to auction-off repossession assignments. For example, the server may notify all repossession agent tracking devices near a car to be repossessed and award the repossession assignment to the repossession agent that responds to the notification with the lowest bid amount.

The operations of blocks 302 and 320 included in the method 700 may be similar to as described above with reference to FIG. 3, and the operations of blocks 502-506, 514-516 may be similar to as described above with reference to FIG. 5. In block 302, the processor of the server may obtain repossession agent information corresponding to a plurality of repossession agents. In determination block 502, the processor of the server may determine whether account information for an account in-default has been obtained. If it is determined that no account information for an account in-default is obtained (i.e., determination block 502="No"), in optional block 320 the processor of the server may wait a period and then may continue with the operations in block 302, such as by obtaining updated GPS coordinates for all repossession agent tracking devices of registered repossession agents. However, if it is determined that account information for an account in-default is obtained (i.e., determination block 502="Yes"), in block 504 the processor of the server may identify the last known location of the tracking device associated with the account in-default (or the borrower tracking device) based on the obtained account information. In block 506, the processor of the server may identify a plurality of nearby repossession agents by comparing the identified last known location to the obtained repossession agent information.

In block 702, the processor of the server may calculate a starting bid based on the obtained repossession agent information and the obtained account information. For example, the starting bid may be based on the lowest average bounty amount for the identified plurality of repossession agents. As another example, the starting bid may be higher or lower based on the type of property associated with the account in-default (e.g., a more expensive car to be repossessed may warrant a higher starting bid, etc.). As another example, when the last known location corresponds to a dangerous location (e.g., a bad part of town) or an area that generally has a low success rate of repossessions, the starting bid may be calculated to be lower. In block 704, the processor of the server may transmit a message to the identified plurality of nearby repossession agent tracking devices indicating the identified last known location and the calculated starting bid. In some embodiments, the message may include costs and route information as described above with reference to optional block 311 of FIG. 3. In block 706, the processor of the server may receive bid messages from the identified plurality of nearby repossession agent tracking devices indicating their bid information. For example, over a period, the server may receive emails, SMS text messages, or other communications via the Internet that indicate bounty amounts that responding repossession agents are willing to accept the repossession assignment for the account in-default. The server may be configured to accept bid messages for a predetermined amount of time (e.g., a number of milliseconds, seconds, minutes, etc.) or alternatively may receive bid messages until each of the plurality of nearby repossession agent tracking devices has responded.

In block 708, the processor of the server may identify a winning bid (and a winning nearby repo agent) by comparing the bid information in the received bid messages. For example, the server may identify a winning bid as the lowest bid from all the received bid messages. In optional block 710, the processor of the server may transmit the identified winning bid amount to the identified plurality of nearby repossession agent tracking devices and may continue receiving bid message with the operations in block 706. With this technique, the server may enable the plurality of nearby repossession agent tracking devices to continually increase their bids in response to competitor bids. In some embodiments, the server may transmit identified winning bid amounts until no subsequent, better bids are received or alternatively for a predefined number of iterations or period of time. For example, the server may be configured to accept bid messages for a predefined number of bidding rounds or for an unlimited number of bidding rounds during the course of a certain time period (e.g., a minute, etc.).

In block 712, the processor of the server may associate the nearby repossession agent corresponding to the identified winning bid with the account in-default and thereby may assign the repossession assignment. In response to associating the repossession assignment with the responding repossession agent, in block 514 the processor of the server may transmit an award message to the associated repossession agent tracking device indicating the association with the account in-default, and in optional block 516 the server may transmit a rejection message to the other nearby repossession agent tracking devices indicating no association with the account in-default (i.e., the other repossession agents were not awarded the repossession assignment). The method 700 may continue with the operations in optional block 320 by the server waiting a period and then performing the operations in block 302 for obtaining repossession agent information, such as updated GPS coordinates for registered repossession agent tracking devices.

Figure 8:
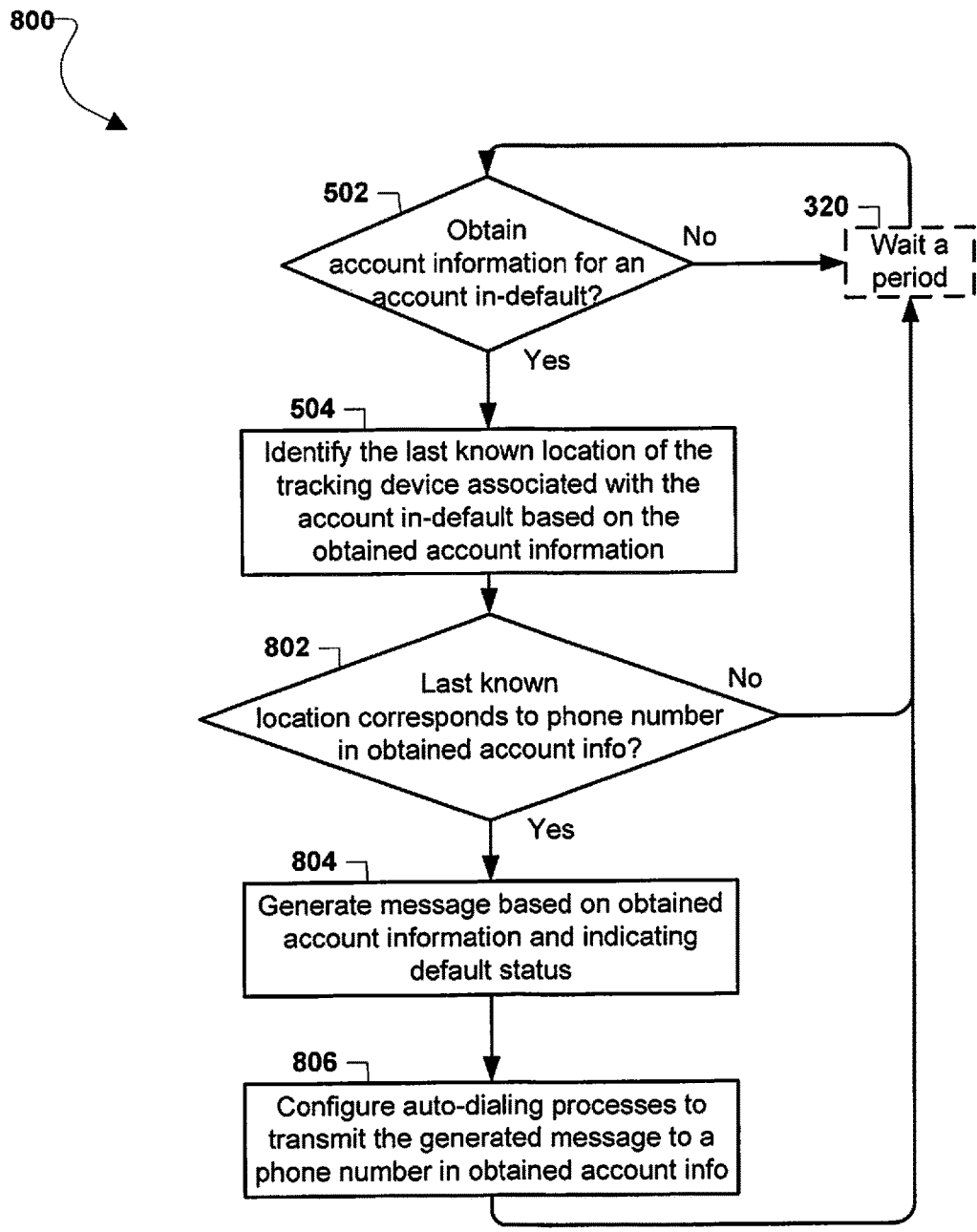
FIG. 8 is a process flow diagram illustrating an embodiment method for a server to configure auto-dialing processes based on a last known location of a borrower tracking device of an account in-default.

FIG. 8 illustrates an embodiment method 800 for a server to configure auto-dialing processes based on a last known address of a borrower tracking device of an account in-default. Typically, auto-dialing processes or units may be employed to notify borrowers of status changes to the accounts related to their financing agreements. For example, a borrower having a car loan may be called via a procedurally-generated message that indicates the borrower has missed a scheduled payment to the car loan lender or breached some condition or term of the car loan. As another example, a borrower leasing a car may be called to indicate the mileage on a leased vehicle has exceeded a value predetermined by a leasing agreement. Such automated calls may not only be beneficial for informing borrowers, but also for distracting borrowers to enable repossession agents to more easily acquire property. For example, a borrower may be pre-occupied with an automated call and not be aware of a repossession agent as a car is towed. However, such automated calls may not be effective if directed to devices that are not near the borrower or the vehicle associated with the financing agreement. For example, an automated call to a borrower's home phone may not be useful if placed while the borrower is driving the car away from the home. So, the method 800 may be performed by the server to configured auto-dialing processes to send messages when the vehicle (e.g., a car subject to an in-default car loan) is determined to be at a known address (e.g., the borrower's home address). As indicated above, various forms of communications may or may not be utilized by the server to communicate with a borrower based on applicable regulations and/or laws, such as safety laws regarding texting while driving and/or privacy laws regarding auto-dialing (e.g., do-not-call regulations, etc.). Accordingly, auto-dialing operations may be considered one exemplary manner of conveying account information to borrowers, but may not be used by the server if autodialing would violate applicable regulations and/or laws, such as safety laws regarding texting while driving and/or privacy laws regarding auto-dialing (e.g., do-not-call regulations, etc.).

The operations of optional block 320 included in the method 800 may be similar to as described above with reference to FIG. 3, and the operations of blocks 502-504 may be similar to as described above with reference to FIG. 5. In determination block 502, the processor of the server may determine whether account information for an account in-default has been obtained. If it is determined that no account information for an account in-default is obtained (i.e., determination block 502="No"), in optional block 320 the processor of the server may wait a period and then may continue with the operations in determination block 502, such as by obtaining account information for in-default accounts. However, if it is determined that account information for an account in-default is obtained (i.e., determination block 502="Yes"), in block 504 the processor of the server may identify the last known location of the tracking device associated with the account in-default (or the borrower tracking device) based on the obtained account information.

In determination block 802, the processor of the server may determine whether the identified last known location corresponds to a phone number in the obtained account information. In particular, the server may compare the current location information within the obtained account information, such as the latest GPS coordinates, to a home address, principal place of business, or other known address linked to the account in-default and associated with a related phone number. For example, the server may compare the last known location GPS coordinates to stored information representing a borrower's home address to determine whether it is likely the property subject to a financing agreement is located at the home address. If so, the server may determine that an auto-dialed phone call to the borrower's home phone number may be beneficial at that time. The server may evaluate the various phone numbers and/or other contact information linked to the account in-default and indicated within the obtained account information to determine whether the last known address coincides with an address that may make an auto-dialed call of benefit.

If the server determines that the last known location does not correspond to a phone number in the obtained account information (i.e., determination block 802="No"), the server may continue with the optional block 320 and wait a period before continuing with the operations in determination block 502. If the server determines that the last known location does correspond to a phone number in the obtained account information (i.e., determination block 802="Yes"), the processor of the server may generate a message based on the obtained account information and indicating default status in block 804. For example, the server may generate an audio sample that includes account information relevant to the borrower associated with the account in-default, such as a computer-generated rendering of the borrower's name and the status of the account (e.g. an audio sample of "Mr. X, you've defaulted on your car loan due to missed payments."). In block 806, the processor of the server may configure an auto-dialing process(es) to transmit the generated message to a phone number in the obtained account information, such as the phone number linked to the account in-default that corresponds to the last known address. The method 800 may then continue with the operations in optional block 320.

Figure 9:
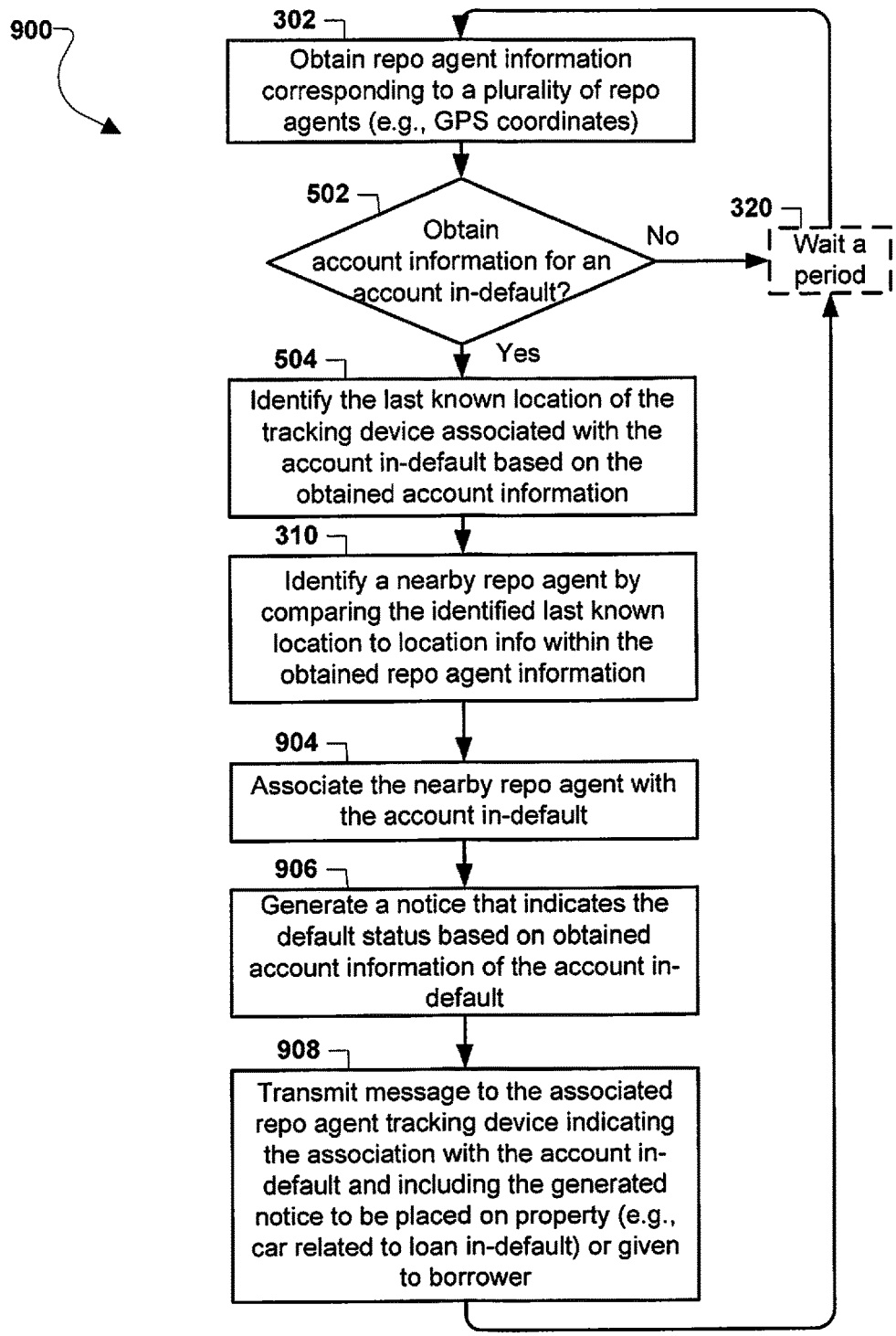
FIG. 9 is a process flow diagram illustrating an embodiment method for a server to transmit notices to nearby repossession agents.

FIG. 9 illustrates an embodiment method 900 for a server to transmit car notices to nearby repossession agent tracking devices for delivery to accounts in-default. As described above, such notices may be used by lenders to indicate default status to borrowers and may typically be placed on the vehicles subject to financing agreements in default. For example, such a notice may be a letter, print-out, or other document that is posted to a car associated with a car loan in-default. Such notices may typically convey to borrowers a warning or other message indicating a financing agreement is or may soon be in-default, and accordingly may be provided to borrowers in person or placed on the borrowers' vehicles subject to financing agreements. The method 900 may be performed by the server to automatically generate notices related to property subject to financing agreements and transmit such notices to repossession agent tracking devices determined to be near the property. In this way, notices may be efficiently distributed based on location information. For example, a repossession agent tracking device may receive from the server a notice for an arbitrary car that the repossession agent happened to be passing while driving to another assignment. It should be appreciated that such notices may or may not include information that may unnecessarily reveal borrower information to third-parties that may encounter the notices. For example, a notice generated to be placed on a publically-parked borrower vehicle may simply indicate that a lender should be contacted immediately while not including any private/personal/financial information about the borrower.

The operations of blocks 302, 310 and 320 included in the method 900 may be similar to as described above with reference to FIG. 3, and the operations of blocks 502-504 may be similar to as described above with reference to FIG. 5. In block 302, the processor of the server may obtain repossession agent information corresponding to a plurality of repossession agents, such as up-to-date GPS coordinates from repossession agent tracking devices of all repossession agents registered with the server. In determination block 502, the processor of the server may determine whether account information for an account in-default has been obtained. If it is determined that no account information for an account in-default is obtained (i.e., determination block 502="No"), in optional block 320 the processor of the server may wait a period and then may continue with the operations in determination block 502, such as by obtaining account information for in-default accounts. However, if it is determined that account information for an account in-default is obtained (i.e., determination block 502="Yes"), in block 504 the processor of the server may identify the last known location of the tracking device associated with the account in-default (or the borrower tracking device) based on the obtained account information. In block 310, the processor of the server may identify a nearby repossession agent by comparing the identified last known location to location information within the obtained repossession agent information. In block 904, the processor of the server may associate the nearby repossession agent with the account in-default.

In determination block 906, based on the obtained account information for the in-default account, the processor of the server may generate a notice that indicates the default status. For example, the server may procedurally generate text that describes a past-due payment status of a car loan, as well as instructions on how to improve the status of the car loan. As another example, the server may generate a message that includes conspicuous language warning a borrower that the vehicle subject to a financing agreement currently in-default may be repossessed within a certain time period unless scheduled payments are submitted. As another example, the generated message may simply indicate that a lender should be called immediately to discuss a borrower account. The generated notice may also include formatting information that may be used to print or otherwise deliver the notice.

In block 908, the processor of the server may transmit a message to the associated repossession agent tracking device indicating the association with the account in-default and including the generated notice to be placed on property (e.g., car related to a car loan in-default) or given to a borrower in person. The message may be an email, SMS text message, or other communication that may be transmitted to the repossession agent tracking device via the Internet. For example, the transmitted message may be an email including the notice and printing instructions enabling the repossession agent tracking device to print the notice. The server may continue with the operations in optional block 320.

Figure 10:
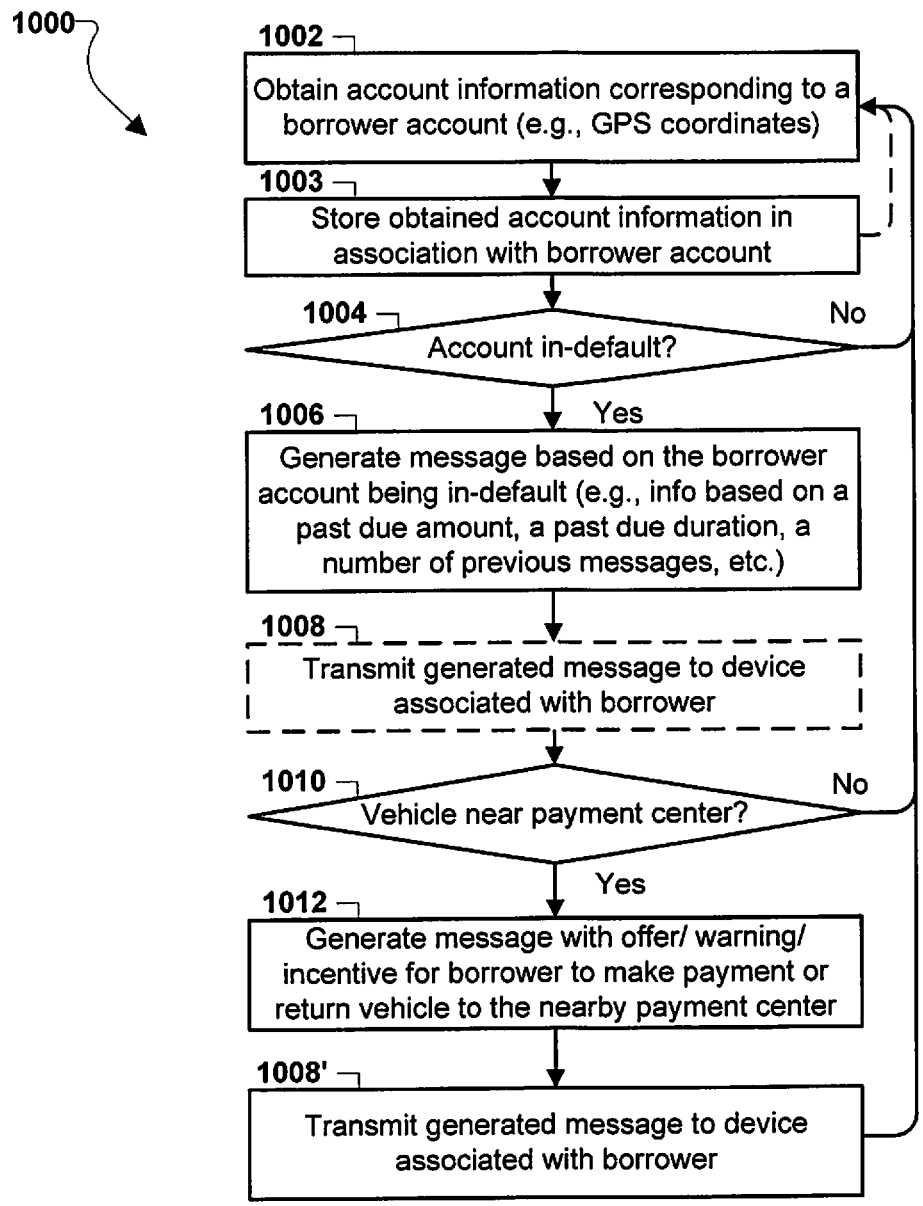
FIG. 10 is a process flow diagram illustrating an embodiment method for a server to transmit various messages to a borrower device associated with an in-default account based on obtained account information (e.g., GPS coordinates of a borrower tracking device).

FIGS. 10-11 illustrate operations for a server to utilize information related to borrower tracking devices within borrowers' vehicles to control or otherwise conduct communications with devices associated with the borrowers. In other words, based on location information and other data transmitted by borrower tracking devices, the server may determine what messages may be sent to borrowers (e.g., smartphones, tracking devices, etc.) in order to assist the borrowers in correcting issues with their borrower accounts and/or their vehicles. Such communications may improve the likelihood that in-default borrower accounts may be returned to acceptable status (e.g., encourage past due payments, etc.) or that vehicles may be recovered. Further, these communications may assist borrowers in avoiding defaults, such as by indicating opportunities to service vehicles or otherwise avoid conditions that may lead to default.

FIG. 10 illustrates an embodiment method 1000 for a server to transmit various messages to a borrower device (e.g., mobile device, desktop computer, borrower tracking device within the borrower's vehicle, etc.) associated with an in-default account based on obtained account information (e.g., GPS coordinates). It should be appreciated that although the operations described below refer to an individual borrower account, the method 1000 may be performed (e.g., in a looping fashion) such that a plurality of borrower accounts and related account information (e.g., GPS coordinates, etc.) may be evaluated over time. For example, in response to receiving a first message with GPS coordinates from a first tracking device via a first cellular network, the server may perform the method 1000 a first time, and in response to receiving a second message with other GPS coordinates from a second tracking device via a second cellular network, the server may perform the method 1000 a second time.

It should be appreciated that a server computing device (e.g., tracking server) or a combination of servers may be configured to perform the operations of the method 1000 individually or in any combination. For example, the server may be configured to transmit messages to a borrower tracking device and/or mobile device when their borrower account is in-default by performing the operations of blocks 1002-1008 as described below. As another example, the server may be configured to transmit offers/warnings/incentives to an in-default borrower's smartphone when their vehicle is near a payment center by performing the operations of blocks 1002-1003, and 1010-1008' as described below. In other words, in some embodiments, the operations of the method 1000 may be performed together as a single method or individually as separate methods, processes, threads, or other routines.

In block 1002, the processor of the server may obtain account information corresponding to a borrower account (e.g., GPS coordinates). The operations in block 1002 may be similar to those of block 304 described above with reference to FIG. 3, except that the account information may or may not be associated with an in-default borrower account. For example, the server may periodically receive account information (e.g., updated location information/GPS coordinates) from borrower tracking devices on vehicles that are associated with both in-default and not in-default accounts. The account information may be obtained directly from borrower tracking devices (e.g., GPS data uploaded via a cellular network to the server) and/or from other servers. In block 1003, the processor of the server may store the obtained account information in association with the borrower account, such as by storing the periodic transmissions from the borrower's tracking device within a stored collection of data (e.g., profile) related to the borrower, the borrower's vehicle, and any agreements associated with the vehicle and the borrower (e.g., lease, loan, etc.). The server may be configured to store data over time such that the location of the borrower's vehicle may be evaluated and identified over a period of time (e.g., identify travel routes or destinations over a week, month, etc.). Such storage of data, such as within profiles, is also described above at least with reference to FIG. 3. In some embodiments, the server may be configured to periodically check for other obtained account information by returning to perform the operations in block 1002.

In determination block 1004, the processor of the server may determine whether the borrower account is currently in-default. The operations of determination block 1004 may be similar to those described with reference to determination block 502 of FIG. 5. For example, the server may simply perform a lookup in a database or other structure to identify an account associated with the obtained account information (e.g., based on an account identifier within the obtained account information) to determine whether data within the account indicates the borrower is in-default or not. In response to determining that the borrower account is not currently in-default (i.e., determination block 1004="No"), the server may continue with the operations for obtaining other account information.

In response to determining that the borrower account is currently in-default (i.e., determination block 1004="Yes"), the server may execute various operations to improve the likelihood of successfully bringing the account back to an acceptable status and/or retrieving the property associated with the in-default borrower account. Accordingly, in block 1006, the processor of the server may generate a message based on the borrower account being in-default. In particular, the server may generate message contents, such as indicators, instructions, scripts, data, files, and/or other information that may be sent to a device of the borrower's to provide warnings, status indicators, and/or other helpful information. For example, the server may utilize data stored in association with the borrower's account, such as a past due amount, a past due duration (i.e., how long the account has been past due or otherwise in default), a number of previous messages already sent to the borrower (i.e., the number of times the server sent a SMS text message, email, proprietary message via an "app", etc.), etc.

In optional block 1008, the processor of the server may transmit the generated message to a device associated with borrower, such as a mobile device and/or a borrower tracking device within the vehicle associated with the borrower. The operations of optional block 1008 may be optional as the server may merely append the generated message to other information for transmission to the borrower's device(s), such as with the operations of block 1008' described below. In various embodiments, the server may transmit the generated message in various communication mediums, such as short-message service (SMS) text messages, emails, telephonic calls (e.g., pre-recorded audio messages, etc.), and/or proprietary messages sent for use by an application (or app) executing on a mobile device associated with the borrower. The communication medium and/or device that the server transmits the message to may be determined based on contact information stored within the borrower's account, such as a stored email address, cell phone number, etc.

In determination block 1010, the processor of the server may determine whether the vehicle associated with the in-default borrower account is near a payment center. Such a determination may be made by comparing the location information indicated by the obtained account information (e.g., GPS coordinates received from the borrower's tracking device within the vehicle) with predefined information indicating the location of known payment centers. The server may compare the current (or last known) location of the borrower tracking device within the borrower's vehicle to geofence data stored in (or otherwise accessible to) the server that defines areas around known payment centers (e.g., storefronts, offices, dealerships, repossession agent buildings, etc.) capable of receiving payments from the borrower and/or custody of the vehicle itself. Such geofences may be defined by a particular GPS coordinates of a known payment center and may include an area around such a GPS coordinates, such as the area within a certain radius of the payment center coordinates. In some embodiments, the server may determine whether the vehicle is about to enter or is otherwise projected to be near a payment center based on the obtained account information. For example, over time, the server may receive GPS coordinates from the tracking device of the vehicle indicating a certain direction (and speed) of movement that the server may utilize to determine that the vehicle is likely (or not) to move within a geofence.

In response to determining that the vehicle associated with the in-default borrower account is not near a payment center (i.e., determination block 1010="No"), the server may continue with the operations for obtaining account information in block 1002. In response to determining that the vehicle associated with the in-default borrower account is near a payment center (i.e., determination block 1010="Yes"), the processor of the server may generate a message with an offer, warning, incentive, or other information to cause the borrower to make a payment or to return the vehicle to the nearby payment center in block 1012. In other words, the server may perform operations to create warnings, offers, deals, and/or other information that may entice a borrower in-default to satisfy his obligations to a lender or other interested party. For example, the server may generate a message that offers the borrower a certain amount of money (e.g., $100, etc.) for turning over his vehicle at a nearby repossession agent building, car lot, and/or other building associated with a leasing or lending entity using the server. As another example, the generated message may include information (e.g., audio recordings, images, text, etc.) indicating that the borrower is past due, owes a certain amount of money, and/or is in imminent danger of having the vehicle retrieved by a repossession agent unless he/she returns the vehicle to a nearby dealership. In some embodiments, the server may generate incentives for the borrower that are more cost effective than costs incurred by a repossession agent. For example, the server may calculate an amount of money that may be offered to the borrower that is less than the travel expenses and fees that may have to be paid to a repossession agent to travel to the borrower's domicile to repossess the vehicle.

In block 1008', the processor of the server may transmit the generated message to a device associated with the borrower. The message may be transmitted to account contact information as stored or otherwise defined within the borrower account. For example, the message may be transmitted to a cell phone number, email address, landline phone number, and/or the borrower tracking device within the borrower's vehicle. The generated message may include the information generated with the operations in block 1006 and/or block 1012. For example, the generated message may include an audio file that may be played by the borrower tracking device within the borrower's vehicle that indicates a money amount is offered in exchange for the borrower voluntarily returning the vehicle to a dealership lot nearby. As another example, the generated message may simply be an SMS text message or email transmitted to smartphone associated with the borrower that indicates a past due amount and the street address of a nearby payment center. In response to transmitting the generated message, the server may continue with the obtaining operations in block 1002. In some embodiments, the server may perform operations to wait for, receive, and process response messages from the borrower or other entities transmitted in response to the messages sent by the server in blocks 1008 or 1008', such as by processing emails, text messages, proprietary messages via an app, and/or other communications received via Internet protocols.

Figure 11A:
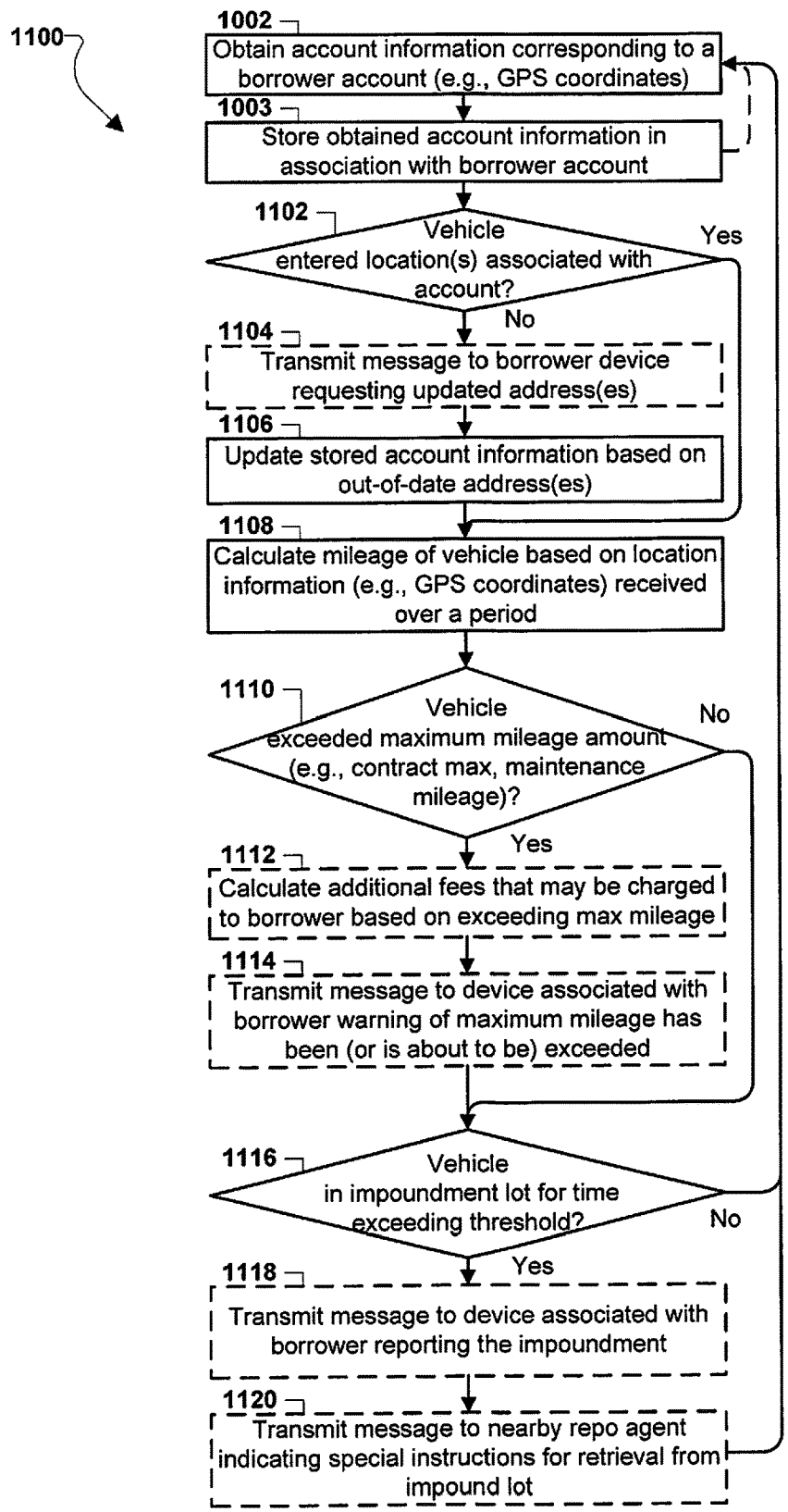
FIG. 11A is a process flow diagram illustrating an embodiment method for a server to transmit various messages to a borrower device based on obtained account information (e.g., GPS coordinates of a borrower tracking device).

FIG. 11A illustrates an embodiment method 1100 for a server to transmit various messages to a borrower device (e.g., mobile device, desktop computer, tracking device within the borrower's vehicle, etc.) based on obtained account information (e.g., GPS coordinates). The operations in method 1100 may be similar to those of method 1000, except that the method 1100 may be performed for the server to communicate with borrowers regardless of whether associated borrower accounts are in-default. For example, the server may perform operations to transmit SMS text messages to a borrower's smartphone in order to request updated account information (e.g., home address, etc.) and/or provide helpful information about required upcoming maintenance for the vehicle or other conditions that are not directly related to the payment status of the borrower's account. Such communications may be beneficial in promoting goodwill with borrowers as well as in ensuring that vehicles that are subject to a financing agreement (e.g., lease, loan, etc.) may be maintained in conditions suitable for resale or reuse.

It should be appreciated that a server computing device or a combination of servers may be configured to perform the operations of the method 1100 individually or in any combination. For example, the server may be configured to evaluate whether a vehicle has traveled to known locations associated with a borrower account by performing the operations of blocks 1002-1003, and 1102-1106 as described below. As another example, the server may be configured to evaluate the current mileage of a vehicle against a maximum mileage amount (e.g., a mileage amount not to be exceeded as determined by predefined terms agreed to in a lease, loan, etc.) by performing the operations of blocks 1002-1003, and 1108-1114 as described below. As another example, the server may be configured to evaluate the location of a vehicle against known impoundment lots by performing the operations of blocks 1002-1003 and 1116-1120. In other words, in some embodiments, the operations of the method 1100 may be performed together as a single method or individually as separate methods, processes, threads, or other routines.

The operations for obtaining and storing account information (e.g., current GPS coordinates of a tracking device, etc.) in blocks 1002-1003 may be as described above with reference to FIG. 10. In determination block 1102, the processor of the server may determine whether a vehicle associated with the account information and the borrower account entered a predefined location(s) associated with the borrower account. In particular, the server may compare location information within the obtained account information (i.e., current or last known GPS coordinates/position of the borrower's tracking device within the vehicle) to other coordinates related to the borrower and as defined within the borrower's account (or stored profile). For example, the server may compare the current borrower tracking device position to geofence areas surrounding the borrower's previously reported home address and/or work address. The server may be configured to expect the borrower's vehicle to have entered some or all of the predefined locations within a predefined time period.

The determination of determination block 1102 may be made by the server in response to obtaining a plurality of locations of the borrower's tracking device over a period of time. For example, the server may be configured to evaluate GPS coordinates of the borrower's vehicle over a week, month, year, etc. in order to determine whether the vehicle has traveled to (or entered within proximity) of one of the predefined locations associated with the borrower's account.

If the vehicle has not entered these locations in the predefined time period, the server may determine that the predefined locations are inaccurate, out-of-date, or otherwise irrelevant, indicating that there likely needs to be a change to the information of the borrower's account (e.g., address of record, etc.). Accordingly, in response to determining that the vehicle has not entered a predefined location(s) associated with the borrower's account (i.e., determination block 1102="No"), the processor of the server may transmit a message to a borrower device requesting updated address(es) in optional block 1104. For example, the server may transmit an SMS text message, an email, an automated phone call, and/or other communication indicating that the stored information associated with the borrower seems to be incorrect or out-of-date and requesting additional input from the borrower. The operations in optional block 1104 may be optional as the request for updated address(es) may be sent in combination with other requests or other information, such as the messages transmitted with operations in blocks 1008, 1008' described above with reference to FIG. 10 and/or the messages transmitted with operations in blocks 1114, 1120 as described below. In block 1106, the processor of the server may update the stored account information associated with the borrower (e.g., the borrower profile data, etc.) based on the out-of-date address(es). For example, the server may set a bit or other information within the borrower's stored profile that indicates the home and/or work address associated with the borrower is no longer valid and must be updated by the borrower, a lender, or other appropriate party.

In response to determining that the vehicle has entered the predefined location(s) associated with the borrower account (i.e., determination block 1102="Yes") or in response to performing the operations of block 1106, the processor of the server may calculate the mileage of the vehicle based on location information (e.g., GPS coordinates) received over a period in block 1108. For example, the server may evaluate location information reported to the server by the tracking device within the borrower's vehicle over a period of time (e.g., time since the vehicle was leased, time since a loan was acquired related to the vehicle, etc.) in order to estimate the miles traveled by the vehicle over that period of time. This may be important in determining when the borrower is potentially nearing a default on an agreement due to overuse of the vehicle. Additionally, such mileage calculations may be valuable in identifying when the vehicle may need to be serviced or otherwise receive regular maintenance. For example, the vehicle may benefit from being serviced at a garage when nearing certain mileage milestones (e.g., every 3000 miles, etc.). In some embodiments, the server may simply calculate (or identify) mileage of the vehicle based on account information obtained with the operations of block 1002 that include data indicating a current odometer reading of the vehicle. In some embodiments, the calculated mileage may be an estimation or prediction of the mileage that the vehicle may have at a certain time in the near future. For example, based on borrower tracking device location information obtained over a certain period of time, the server may calculate that the vehicle may likely achieve a certain mileage before a next, periodic evaluation period, time of day, day of week, month of year, etc.

In determination block 1010, the processor of the server may determine whether the vehicle has exceeded (or likely will exceeded) a maximum mileage amount based on the calculated mileage. For example, the server may compare an estimated current mileage or predicted mileage of the vehicle to maximum mileage information stored in the borrower's account (or profile), such as a mileage cap defined within a lease agreement and agreed upon by a leasor. In response to determining the calculated mileage of the vehicle has exceeded (or likely will exceed) the maximum mileage amount (i.e., determination block 1110="Yes"), the processor of the server may calculate additional fees that may be charged to the borrower based on exceeding the maximum mileage associated with the borrower's account in optional block 1112. For example, a charge per mile over the maximum mileage may be calculated based on stored data indicating various conditions or terms of a loan agreement or lease agreement.

In optional block 1114, the processor of the server may transmit a message to a device associated with the borrower warning that the maximum mileage has been (or is about to be) exceeded. For example, the message may be an SMS text message or proprietary message configured for use by an app on the borrower's smartphone that may include information warning the borrower that the vehicle has exceeded its maximum mileage, that maintenance is required, and/or that fees may be charged to the borrower based on the current calculated mileage. The operations in optional block 1114 may be optional as the warning or other information related to exceeding the maximum mileage may be transmitted within another message from the server, such as described below with reference to optional block 1118.

In response to determining the calculated mileage of the vehicle has not exceeded the maximum mileage amount (i.e., determination block 1110="No") or in response to performing the operations in optional block 1114, the processor of the server may determine whether the vehicle is located in an impoundment lot for a time exceeding a threshold in determination block 1116. In particular, the server may compare the current location of the vehicle associated with the borrower account (and obtained account information) to predefined locations (e.g., geofences, GPS coordinates, etc.) of known impoundment lots. If the current location of the vehicle matches a known impoundment lot location (or geofence), the server may also determine whether the vehicle has been located near or in the known impoundment location for a period of time, indicating that the vehicle has likely been impounded. For example, the server may evaluate historical location information received from the borrower tracking device of the vehicle to determine whether the borrower tracking device reported location information within an impoundment lot for over a few hours, days, etc., thus indicating a high likelihood that the vehicle was not merely visiting the impoundment lot, but has instead been impounded. Such information may be valuable in providing instructions for repossession agents and/or borrowers for retrieving the impounded vehicle. For example, additional procedures for properly interacting with lawful impoundment lots may need to be communicated to a repossession agent assigned to retrieve the vehicle.

In response to determining the vehicle is not located in an impoundment lot for a time exceeding the threshold (i.e., determination block 1116="No"), the server may then continue with operations in block 1002 for obtaining further account information. In response to determining the vehicle is located in an impoundment lot for a time exceeding the threshold (i.e., determination block 1116="Yes"), then the vehicle may be considered likely impounded, and thus, in optional block 1118 the processor of the server may transmit a message to a device associated with the borrower reporting the impoundment as well as directions for retrieval of the vehicle (e.g., payment instructions, numbers to call, etc.). The operations of optional block 1118 may be optional as the borrower may or may not be required to act or be notified in such an event. For example, based on stored data indicating conditions/terms of a lease agreement, the server may determine that a message to the borrower is not necessary as only a repossession agent should be contacted to retrieve the vehicle.

In optional block 1120, the processor of the server may transmit a message to a nearby repossession agent indicating special instructions for retrieval of the vehicle from the impoundment lot. For example, the special instructions may indicate procedures or data (e.g., addresses or contact information for administrative entities related to the impoundment lot, etc.) useful to the repossession agent for properly retrieving the vehicle from an authority presiding over the impoundment lot (e.g., police, etc.). The server may then continue with operations in block 1002 for obtaining further account information.

In some embodiments, the server may perform operations to wait for, receive, and process response messages from the borrower or other entities transmitted in response to the messages sent by the server in blocks 1104, 1114, 1118, 1120, such as by processing emails, text messages, proprietary messages via an app, and/or other communications received via Internet protocols. In some embodiments, the server may receive responses from the borrower (e.g., messages from a borrower's smartphone and/or the borrower tracking device) with the operations in block 1002. For example, the server may receive updated address information from a borrower's phone in response to the server transmitting a request for such information. In other words, such responses may be considered data obtained as account information with the operations of block 1002.

Figure 11B:
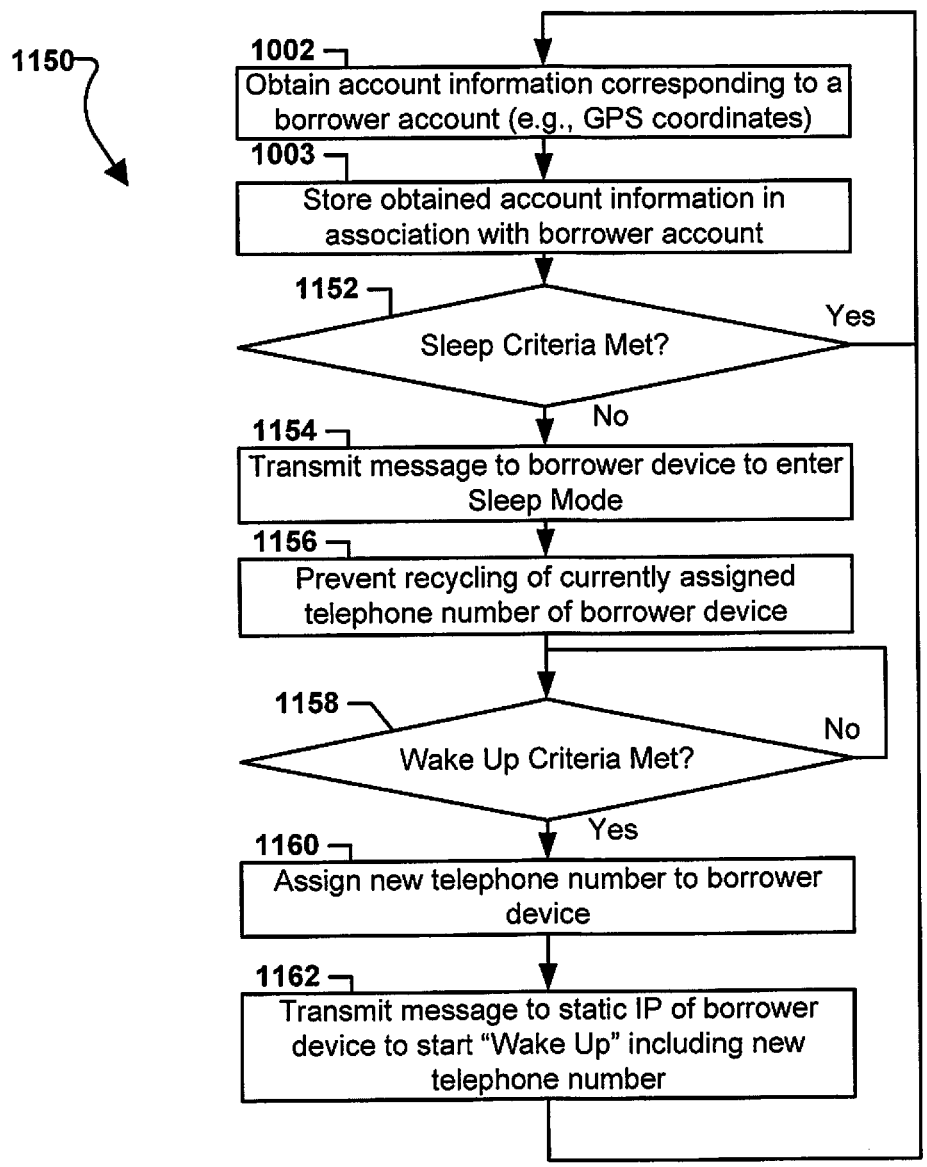
FIG. 11B is a process flow diagram illustrating an embodiment method for a server to "wake up" a borrower device.

FIG. 11B illustrates an embodiment method 1150 for a server to "wake up" a borrower device (e.g., mobile device, desktop computer, tracking device within the borrower's vehicle, etc.). It should be appreciated that a server computing device or a combination of servers may be configured to perform the operations of the method 1100 individually or in any combination. The operations for obtaining and storing account information (e.g., current GPS coordinates of a tracking device, etc.) in blocks 1002-1003 may be as described above with reference to FIG. 10. In determination block 1152, the processor of the server may determine whether a sleep criteria is met for the borrower device. As examples, a sleep criteria may be an indication that the vehicle associated with the borrower device has been sold, the terms of a lease or loan have been completed, etc. Sleep criteria may be met on demand or after a certain period of time. If the sleep criteria is not met (i.e., determination block 1152="No"), in block 1002 the server may perform operations of block 1002 described above.

If the sleep criteria is met (i.e., determination block 1152="Yes"), in block 1154 the server may transmit a message to the borrower device to enter a sleep mode. A sleep mode may be a mode in which the SIM of the borrower device may be suspended and the borrower device may cease sending account information and other messages to the server. In block 1156 the server may prevent recycling of the currently assigned telephone number of the borrower device. In an embodiment, the borrower device may be assigned a telephone number and static IP address when initially installed in the vehicle. The assigned telephone number may not be recycled even though the SIM may be suspended in sleep mode. The server may take various actions to prevent recycling of the assigned telephone number, such as sending a message from the server to the wireless carrier to not recycle the telephone number, applying default rules associated with the telephone number that may keep it from recycling, etc.

In determination block 1158 the server may determine whether wake up criteria for the borrower device are met. Wake up or reactivation criteria may include an indication that a new financing agreement was entered into for the vehicle, indications to track the vehicle, or any other scenario that may require the borrower device to again begin functioning. If wake up criteria are not met (i.e., determination block 1158="No"), the server may continue to determine whether wake up criteria are met in determination block 1158 and the borrower device may remain in sleep mode. When reactivation or wake up criteria are met (i.e., determination block 1158="Yes"), in block 1160 the server may assign a new telephone number to the borrower device. This new telephone number may be associated with the account of the current owner of the vehicle. In block 1162 the server may transmit a message to the static IP of the borrower device to wake up including the new telephone number. The borrower device may replace the previously assigned telephone number with the newly assigned telephone number and may use the newly assigned telephone number to again start sending account information to the server that may be received in block 1002. In this manner, borrower devices (and other GPS devices described herein that may utilize telephone numbers) may be placed in sleep mode and woken up as needed.

Figure 12:
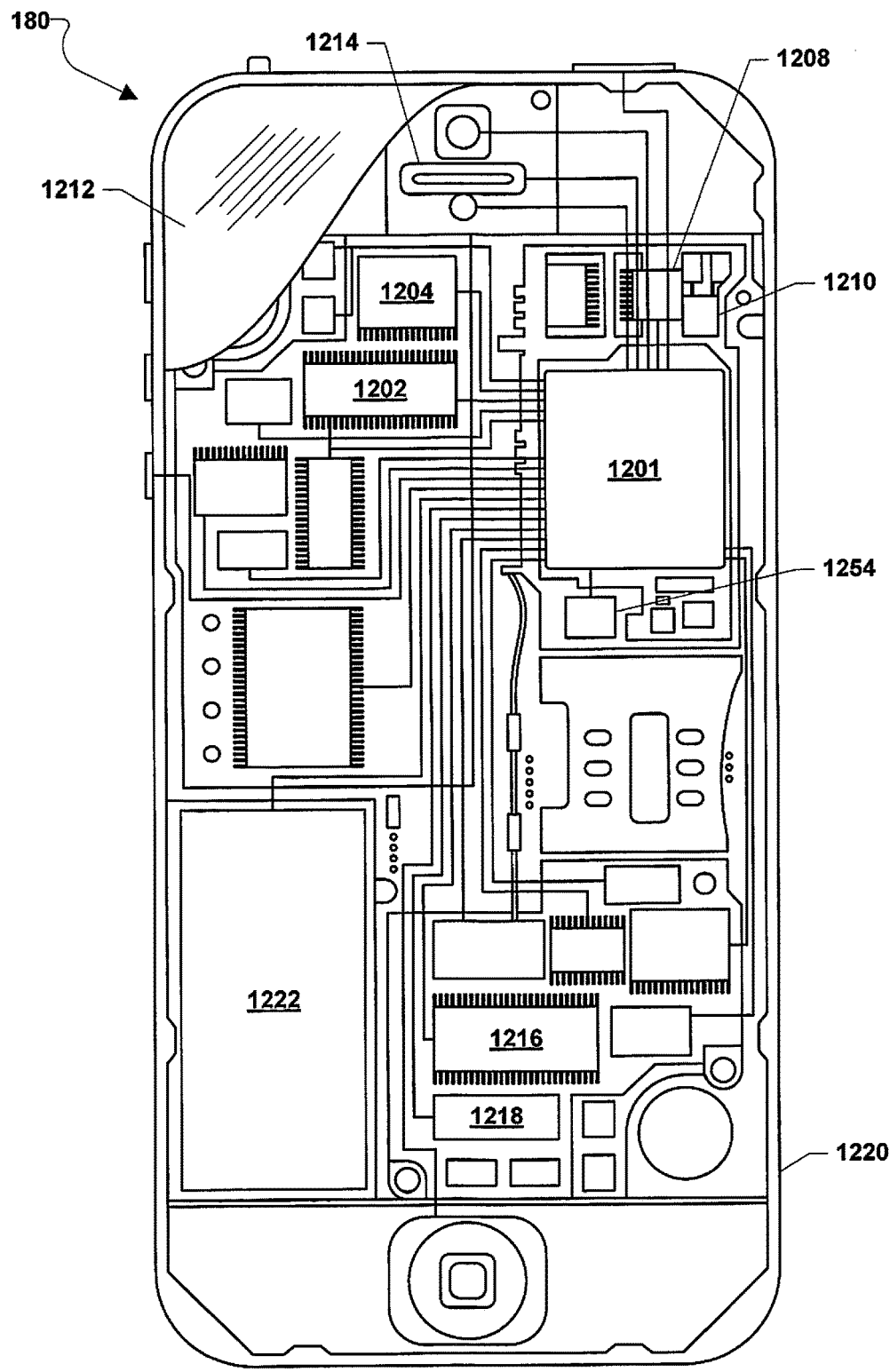
FIG. 12 is a component block diagram of an example mobile device suitable for use in various embodiments.

FIG. 12 illustrates an embodiment smartphone mobile device 180 for use in various embodiments. The smartphone mobile device may include a processor 1201 coupled to a touch screen controller 1204 and an internal memory 1202. The processor 1201 may be one or more multicore ICs designated for general or specific processing tasks. The internal memory 1202 may be volatile or non-volatile memory, and may also be secure and/or encrypted memory, or unsecure and/or unencrypted memory, or any combination thereof. The touch screen controller 1204 and the processor 1201 may also be coupled to a touch screen panel 1212, such as a resistive-sensing touch screen, capacitive-sensing touch screen, infrared sensing touch screen, etc. The smartphone mobile device may have one or more radio signal transceivers 1208 (e.g., Peanut®, Bluetooth®, Zigbee®, Wi-Fi, RF radio) and antennae 1210, for sending and receiving, coupled to each other and/or to the processor 1201. The transceivers 1208 and antennae 1210 may be used with the above-mentioned circuitry to implement the various wireless transmission protocol stacks and interfaces. The smartphone mobile device may include a cellular network wireless modem chip 1216 that enables communication via a cellular network and is coupled to the processor 1201. The smartphone mobile device may include a peripheral device connection interface 1218 coupled to the processor 1201. The peripheral device connection interface 1218 may be singularly configured to accept one type of connection, or multiply configured to accept various types of physical and communication connections, common or proprietary, such as USB, FireWire, Thunderbolt, or PCIe. The peripheral device connection interface 1218 may also be coupled to a similarly configured peripheral device connection port (not shown). The smartphone mobile device may also include speakers 1214 for providing audio outputs. The smartphone mobile device may also include a housing 1220, constructed of a plastic, metal, or a combination of materials, for containing all or some of the components discussed herein. The smartphone mobile device may include a power source 1222 coupled to the processor 1201, such as a disposable or rechargeable battery. The rechargeable battery may also be coupled to the peripheral device connection port to receive a charging current from a source external to the smartphone mobile device. Additionally, the smartphone mobile device may include a GPS receiver chip 1254 coupled to the processor 1201.

Figure 13:
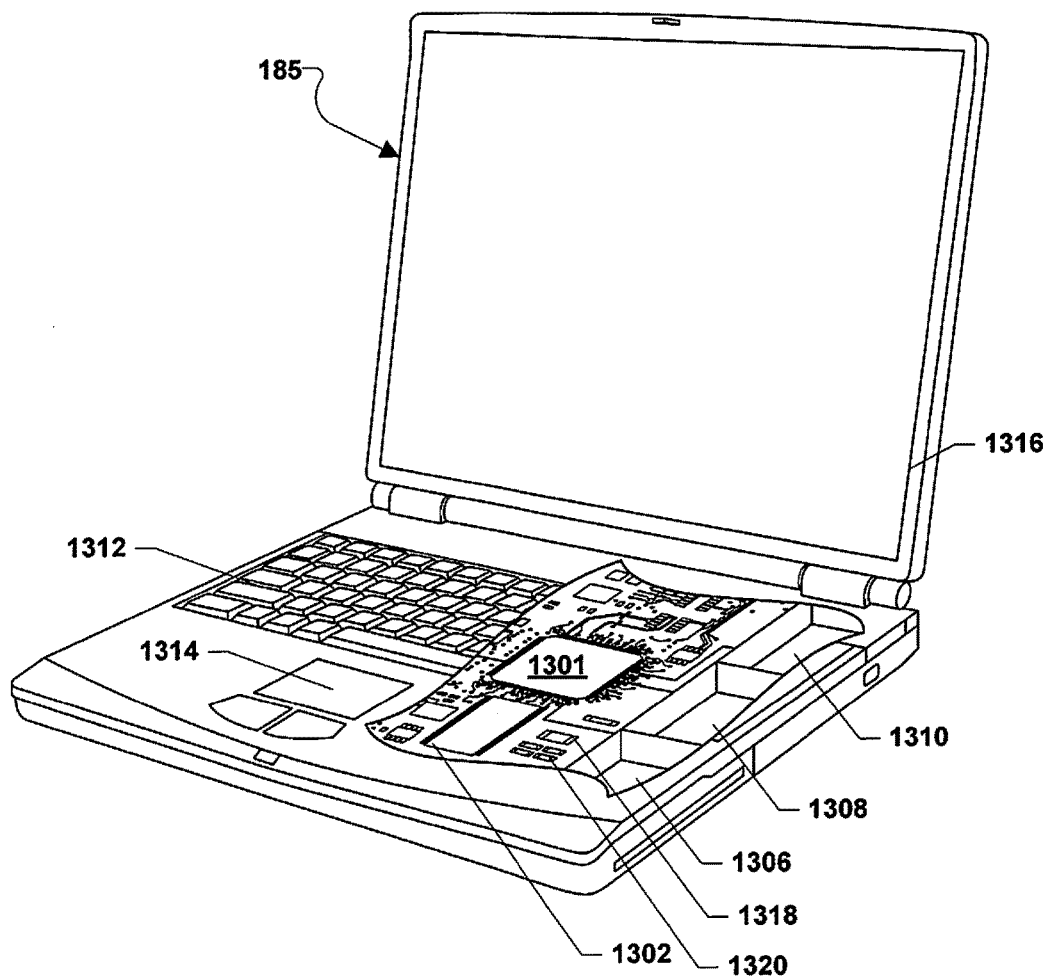
FIG. 13 is a component block diagram of another mobile computing device suitable for use in various embodiments.

Other forms of computing devices, including personal computers and laptop computers, may be used to implementing the various embodiments. Such computing devices typically include the components illustrated in FIG. 13 which illustrates an example laptop computing device 185. Many laptop computers include a touch pad 1314 that serves as the computer's pointing device, and thus may receive drag, scroll, and flick gestures similar to those implemented on mobile computing devices equipped with a touch screen display and described above. Such a laptop computing device 185 generally includes a processor 1301 coupled to volatile internal memory 1302 and a large capacity nonvolatile memory, such as a disk drive 1306. The laptop computing device 185 may also include a compact disc (CD) and/or DVD drive 1308 coupled to the processor 1301. The laptop computing device 185 may also include a number of connector ports 1310 coupled to the processor 1301 for establishing data connections or receiving external memory devices, such as a network connection circuit for coupling the processor 1301 to a network. The laptop computing device 185 may have one or more radio signal transceivers 1318 (e.g., Peanut®, Bluetooth®, ZigBee®, Wi-Fi®, RF radio) and antennas 1320 for sending and receiving wireless signals as described herein. The transceivers 1318 and antennas 1320 may be used with the above-mentioned circuitry to implement the various wireless transmission protocol stacks/interfaces. In a laptop or notebook configuration, the computer housing includes the touch pad 1314, the keyboard 1312, and the display 1316 all coupled to the processor 1301. Other configurations of the computing device may include a computer mouse or trackball coupled to the processor (e.g., via a USB input) as are well known, which may also be used in conjunction with the various embodiments.

Figure 14:
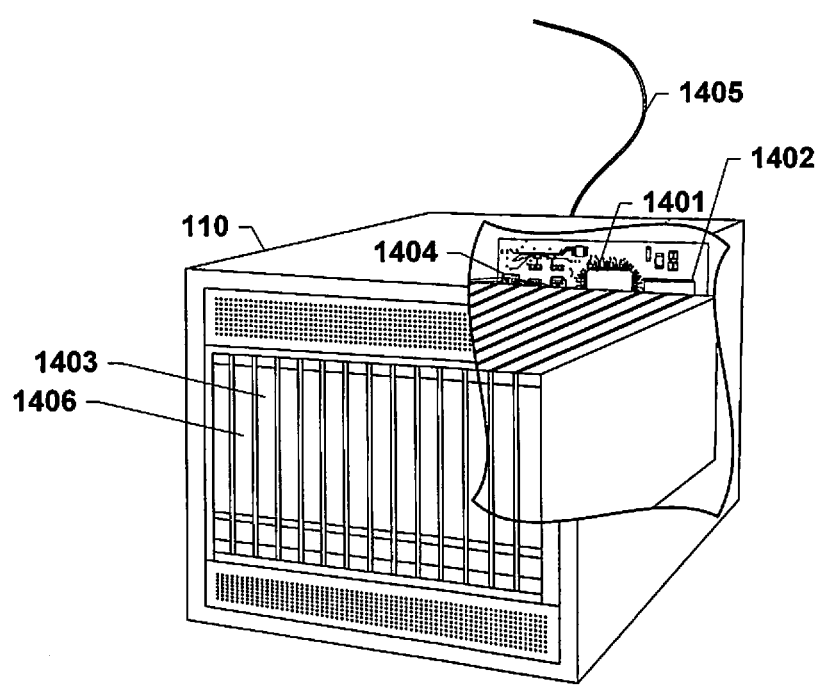
FIG. 14 is a component block diagram of a server computing device suitable for use in various embodiments.

The various embodiments may be implemented on any of a variety of commercially available server devices, such as the server computing device 110 illustrated in FIG. 14. Such a server computing device 110 typically includes a processor 1401 coupled to volatile memory 1402 and a large capacity nonvolatile memory, such as a disk drive 1403. The server computing device 110 may also include a floppy disc drive, compact disc (CD) or DVD disc drive 1406 coupled to the processor 1401. The server computing device 110 may also include network access ports 1404 coupled to the processor 1401 for establishing data connections with a network 1405, such as a local area network coupled to other broadcast system computers and servers.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or server-readable medium or a non-transitory processor-readable storage medium. The steps of a method or algorithm disclosed herein may be embodied in a processor-executable software module which may reside on a tangible, non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a server to utilize information related to tracking devices to support repossession, the server in communication with a plurality of repossession agent tracking devices mounted in tow trucks of repossession agents and in communication with a plurality of borrower tracking devices mounted in vehicles, each of the plurality of repossession agent tracking devices configured to transmit location information of that repossession agent tracking device and both transmit and receive messages, and each of the plurality of borrower tracking devices configured to transmit location information of that borrower tracking device, the method comprising:

obtaining, by a processor of the server, repossession agent information corresponding to a plurality of repossession agents, wherein the repossession agent information includes the transmitted location information of the repossession agent tracking devices associated with each of the plurality of repossession agents;

obtaining, by the processor of the server, account information corresponding to a plurality of accounts in-default, wherein the account information includes the transmitted location information of the borrower tracking devices within the vehicle associated with each of the plurality of accounts in-default;

identifying, by the processor of the server, a last known location for the borrower tracking device within the vehicle associated with each of the plurality of accounts in-default based on the obtained account information;

identifying, by the processor of the server, a nearby repossession agent for each of the plurality of accounts in-default by comparing the identified last known location for the borrower tracking device within the vehicle associated with each of the plurality of accounts in-default to the obtained repossession agent information;

calculating, by the processor of the server, a starting bid for the account in-default;

identifying, by the processor of the server, a plurality of nearby repossession agents for the account in-default by comparing the identified last known location for the borrower tracking device within the vehicle associated with the account in-default to the obtained repossession agent information;

transmitting, by the processor of the server to the repossession agent tracking devices associated with the identified plurality of nearby repossession agents, an offer message that indicates the last known location for the borrower tracking device within the vehicle associated with the account in-default and the starting bid for the account in-default;

receiving, by the processor of the server, a bid message from each one of the identified plurality of nearby repossession agents in response to transmitting the offer message, wherein each bid message is generated and received from the repossession agent tracking device of one of the identified plurality of nearby repossession agents;

selecting, by the processor of the server, the one of the identified plurality of nearby repossession agents submitting a highest of the received bid messages;

associating, by the processor of the server, the selected one of the identified plurality of nearby repossession agents with the account in-default; and transmitting, by the processor of the server, an award message to the repossession agent tracking device of the selected one of the identified plurality of nearby repossession agents associated with the account in-default.

2. The method of claim 1, wherein the transmitted location information of repossession agent tracking devices associated with each of the plurality of repossession agents and the transmitted location information of borrower tracking devices within the vehicle associated with each of the plurality of accounts in-default include GPS coordinates.

3. The method of claim 1, wherein the vehicle associated with each of the plurality of accounts in-default is any of a car, a truck, a motorcycle, a boat, a recreational vehicle (RV), an all-terrain vehicle (ATV), a jet ski, and a plane.

4. The method of claim 1, wherein obtaining, by the processor of the server, repossession agent information corresponding to the plurality of repossession agents comprises obtaining, by the processor of the server, repossession agent information corresponding to the plurality of repossession agents having a preferred status.

5. The method of claim 1, further comprising transmitting, by the processor of the server, to the repossession agent tracking devices associated with the identified nearby repossession agent for each of the plurality of accounts in-default a message that indicates the last known location for the borrower tracking device within the vehicle associated with that respective account in-default.

6. The method of claim 5, further comprising calculating, by the processor of the server, a route and a cost for repossessing vehicles for each of the plurality of accounts in-default.

7. The method of claim 1, further comprising:

generating, by the processor of the server, a notice for the account in-default; and transmitting, by the processor of the server, to the repossession agent tracking devices associated with the identified plurality of nearby repossession agents the notice.

8. A system, comprising:

a plurality of repossession agent tracking devices mounted in tow trucks of repossession agents, each of the plurality of repossession agent tracking devices configured to transmit location information of that repossession agent tracking device and both transmit and receive messages;

a plurality of borrower tracking devices mounted in vehicles, each of the plurality of borrower tracking devices configured to transmit location information of that borrower tracking device; and a computing device in communication with the plurality of repossession agent tracking devices and the plurality of borrower tracking devices, the computing device comprising:

a processor configured with processor-executable instructions to perform operations comprising:

obtaining repossession agent information corresponding to a plurality of repossession agents, wherein the repossession agent information includes the transmitted location information of the repossession agent tracking devices associated with each of the plurality of repossession agents;

obtaining account information corresponding to a plurality of accounts in-default, wherein the account information includes the transmitted location information of the borrower tracking devices within the vehicle associated with each of the plurality of accounts in-default;

identifying a last known location for the borrower tracking device within the vehicle associated with each of the plurality of accounts in-default based on the obtained account information;

identifying a nearby repossession agent for each of the plurality of accounts in-default by comparing the identified last known location for the borrower tracking device within the vehicle associated with each of the plurality of accounts in-default to the obtained repossession agent information;

calculating a starting bid for the account in-default;

identifying a plurality of nearby repossession agents for the account in-default by comparing the identified last known location for the borrower tracking device within the vehicle associated with the account in-default to the obtained repossession agent information;

transmitting to the repossession agent tracking devices associated with the identified plurality of nearby repossession agents, an offer message that indicates the last known location for the borrower tracking device within the vehicle associated with the account in-default and the starting bid for the account in-default;

receiving a bid message from each one of the identified plurality of nearby repossession agents in response to transmitting the offer message, wherein each bid message is generated and received from the repossession agent tracking device of one of the identified plurality of nearby repossession agents;

selecting the one of the identified plurality of nearby repossession agents submitting a highest of the received bid messages;

associating the selected one of the identified plurality of nearby repossession agents with the account in-default; and transmitting an award message to the repossession agent tracking device of the selected one of the identified plurality of nearby repossession agents associated with the account in-default.

9. The system of claim 8, wherein the transmitted location information of repossession agent tracking devices associated with each of the plurality of repossession agents and the transmitted location information of borrower tracking devices within the vehicle associated with each of the plurality of accounts in-default include GPS coordinates.

10. The system of claim 8, wherein the vehicle associated with each of the plurality of accounts in-default is any of a car, a truck, a motorcycle, a boat, a recreational vehicle (RV), an all-terrain vehicle (ATV), a jet ski, and a plane.

11. The system of claim 8, wherein the processor is configured with processor-executable instructions to perform operations such that obtaining repossession agent information corresponding to the plurality of repossession agents comprises obtaining repossession agent information corresponding to the plurality of repossession agents having a preferred status.

12. The system of claim 8, wherein the processor is configured with processor-executable instructions to perform operations further comprising transmitting, to the repossession agent tracking devices associated with the identified nearby repossession agent for each of the plurality of accounts in-default, a message that indicates the last known location for the borrower tracking device within the vehicle associated with that respective account in-default.

13. The system of claim 12, wherein the processor is configured with processor-executable instructions to perform operations further comprising calculating a route and a cost for repossessing vehicles for each of the plurality of accounts in-default.

14. The system of claim 8, wherein the processor is configured with processor-executable instructions to perform operations further comprising:

generating a notice for the account in-default; and transmitting, to the repossession agent tracking devices associated with the identified plurality of nearby repossession agents, the notice.

15. A system, comprising:

a plurality of repossession agent tracking devices mounted in tow trucks of repossession agents, each of the plurality of repossession agent tracking devices configured to transmit location information of that repossession agent tracking device and both transmit and receive messages;

a plurality of borrower tracking devices mounted in vehicles, each of the plurality of borrower tracking devices configured to transmit location information of that borrower tracking device; and a computing device in communication with the plurality of repossession agent tracking devices and the plurality of borrower tracking devices, the computing device comprising:

means for obtaining repossession agent information corresponding to a plurality of repossession agents, wherein the repossession agent information includes the transmitted location information of the repossession agent tracking devices associated with each of the plurality of repossession agents;

means for obtaining account information corresponding to a plurality of accounts in-default, wherein the account information includes the transmitted location information of the borrower tracking devices within the vehicle associated with each of the plurality of accounts in-default;

means for identifying a last known location for the borrower tracking device within the vehicle associated with each of the plurality of accounts in-default based on the obtained account information;

means for identifying a nearby repossession agent for each of the plurality of accounts in-default by comparing the identified last known location for the borrower tracking device within the vehicle associated with each of the plurality of accounts in-default to the obtained repossession agent information;

means for calculating a starting bid for the account in-default;

means for identifying a plurality of nearby repossession agents for the account in-default by comparing the identified last known location for the borrower tracking device within the vehicle associated with the account in-default to the obtained repossession agent information;

means for transmitting to the repossession agent tracking devices associated with the identified plurality of nearby repossession agents, an offer message that indicates the last known location for the borrower tracking device within the vehicle associated with the account in-default and the starting bid for the account in-default;

means for receiving a bid message from each one of the identified plurality of nearby repossession agents in response to transmitting the offer message, wherein each bid message is generated and received from the repossession agent tracking device of one of the identified plurality of nearby repossession agents;

means for selecting the one of the identified plurality of nearby repossession agents submitting a highest of the received bid messages;

means for associating the selected one of the identified plurality of nearby repossession agents with the account in-default; and means for transmitting an award message to the repossession agent tracking device of the selected one of the identified plurality of nearby repossession agents associated with the account in-default.

16. The system of claim 15, wherein the transmitted location information of repossession agent tracking devices associated with each of the plurality of repossession agents and the transmitted location information of borrower tracking devices within the vehicle associated with each of the plurality of accounts in-default include GPS coordinates.

17. The system of claim 15, wherein the vehicle associated with each of the plurality of accounts in-default is any of a car, a truck, a motorcycle, a boat, a recreational vehicle (RV), an all-terrain vehicle (ATV), a jet ski, and a plane.

18. The system of claim 15, wherein means for obtaining repossession agent information corresponding to the plurality of repossession agents comprises means for obtaining repossession agent information corresponding to the plurality of repossession agents having a preferred status.

19. The system of claim 15, further comprising means for transmitting, to the repossession agent tracking devices associated with the identified nearby repossession agent for each of the plurality of accounts in-default, a message that indicates the last known location for the borrower tracking device within the vehicle associated with that respective account in-default.

20. The system of claim 19, further comprising means for calculating a route and a cost for repossessing vehicles for each of the plurality of accounts in-default.

21. The system of claim 15, further comprising:
means for generating a notice for the account in-default; and
means for transmitting, to the repossession agent tracking devices associated with the identified plurality of nearby repossession agents, the notice.

22. The system of claim 4, wherein:
each of the plurality of repossession agent tracking devices comprises its own respective wireless transceiver, GPS receiver, and display, the display configured to output text from the offer message and the award message; and
each of the plurality of borrower tracking devices comprises its own respective wireless transceiver and GPS receiver.

* * * * *